(12) United States Patent
Kawano et al.

(10) Patent No.: US 6,528,177 B2
(45) Date of Patent: Mar. 4, 2003

(54) CLADDING MATERIAL AND MANUFACTURING METHOD THEREFOR

(75) Inventors: Takayuki Kawano, Nagasaki (JP); Yoshiaki Inoue, Nagasaki (JP); Katsuaki Inoue, Nagasaki (JP); Kawaichi Katsumi, Nagasaki (JP); Hiroshi Iwabuchi, Nagasaki (JP); Kazumasa Nishio, 2-4-38-703, Takanosu, Yahatanishi-ku, Kitakyushu-shi, Fukuoka-ken (JP); Shizuo Mukae, 5-43-7, Kusaminishi, Kokuraminami-ku, Kitakyushu-shi, Fukuoka-ken (JP); Masahiro Hirata, Nagasaki (JP)

(73) Assignees: Mitsubishi Heavy Industries, Ltd., Tokyo (JP); Kazumasa Nishio, Kitakyushu (JP); Shizuo Mukae, Kitakyushu (JP)

( * ) Notice: Subject to any disclaimer, the term of this patent is extended or adjusted under 35 U.S.C. 154(b) by 0 days.

(21) Appl. No.: 09/984,229

(22) Filed: Oct. 29, 2001

(65) Prior Publication Data

US 2002/0168540 A1 Nov. 14, 2002

(30) Foreign Application Priority Data

May 11, 2001 (JP) .......................................... 2001-142383

(51) Int. Cl.⁷ .......................... B32B 15/20; B23K 31/00

(52) U.S. Cl. ..................... 428/615; 148/516; 148/535; 228/196; 228/235.2; 228/235.3; 228/262.5; 428/650; 428/651; 428/652; 428/653; 428/654; 428/655; 428/656

(58) Field of Search ................................ 428/615, 650, 428/651, 652, 653, 654, 655, 656; 148/516, 535; 228/196, 235.2, 235.3, 262.5

(56) References Cited

U.S. PATENT DOCUMENTS 4,489,140 A * 12/1984 Pulliam et al. ............. 428/654

FOREIGN PATENT DOCUMENTS

| JP | 1-133689 | 5/1989 | |
| JP | 1-278979 | 11/1989 | |
| JP | 8-309561 | 11/1996 | |
| JP | 8-309561 A | * 11/1996 | |

* cited by examiner

Primary Examiner—Robert R. Koehler
(74) Attorney, Agent, or Firm—Wenderoth, Lind & Ponack, L.L.P.

(57) ABSTRACT

An object of the present invention is to provide a cladding material, which has high joining strength and excellent productivity, and a manufacturing method therefor; in order to attain this object, the present invention provides a cladding material comprising: a first material to be joined which is made of aluminum or an aluminum alloy; a second material to be joined which is made of a single metal or an alloy and which is join the first material to be joined; and an intermediate layer which is provided between the first and second materials to be joined.

15 Claims, 16 Drawing Sheets

CLADDING MATERIAL AND MANUFACTURING METHOD THEREFOR

BACKGROUND OF THE INVENTION

1. Field of the Invention

The present invention relates to a cladding material comprising dissimilar metal materials to be joined, and in particular to a cladding material comprising materials to be joined and an intermediate layer between them, and a manufacturing method therefor.

2. Description of the Related Art

Recently, aluminum or aluminum alloys have been used as the material for ships and vessels. Aluminum and aluminum alloys have excellent workability and are light weight. Therefore, a case wherein they are used together with steel, which is the main material for ships and vessels, are increasing. In order to join aluminum or the like with steel methods such as diffusion joining, friction joining, explosive joining, and the like have been used.

However, the joining strength is insufficiently in diffusion joining.

Friction joining is suitable for joining parts of relatively small size; therefore, it is unsuitable for joining parts of large size such as parts for ships and vessels.

In explosive joining, it is necessary to previously sandwich an insert material such as Ti, Ni, and the like between the materials to be joined; therefore, it has a problem in that the structure of the joining parts is complicated and is a high cost process.

In consideration of the above-described problems with conventional technology, an object of the present invention is to provide a cladding material which has a high joining strength and excellent productivity, and a manufacturing method therefor.

SUMMARY OF THE INVENTION

In order to achieve the object, the present invention provides a cladding material comprising: a first material to be joined which is made of aluminum or an aluminum alloy; a second material to be joined which is made of a single metal or an alloy and which is to be joined with the first material to be joined; and an intermediate layer which is provided between the first material to be joined and the second material to be joined.

The first material to be joined is referred to as the "first material", and the second material to be joined is referred to as the "second material" below.

In the cladding material, the intermediate layer is provided between the first and second materials; therefore, it is possible to realize the joining strength between the first and second materials which is larger than the tensile strength of the first material.

In addition, the present invention provides a cladding material in which a first material which is made of aluminum or an aluminum alloy and a second material which is made of a single metal or an alloy are roll joined under vacuum conditions wherein the joining temperature is in a range from 260 to 600° C.; the draft of the first material is 14% or greater; and an intermediate layer is provided between the first and second materials.

It is preferable to carry out heat treatment at 300 to 500° C. for 10 to 60 minutes after the roll joining.

In the cladding material, since the intermediate layer is provided between the first and second materials by roll joining under such conditions, it is possible to realize the joining strength between the first and second materials larger which is than the tensile strength of the first material.

It is preferable for the intermediate layer to mainly comprise an amorphous phase.

In the cladding material, since the intermediate layer mainly comprises an amorphous phase, it is possible to improve the joining strength between the first and second materials.

In particular, when the second material is made of Fe or an Fe alloy, an intermediate layer mainly comprising an amorphous phase can be provided.

In addition, it is preferable for the intermediate layer to comprise a mixed phase containing an amorphous phase and a crystalline phase.

In the cladding material, since the intermediate layer which comprises a mixed phase containing an amorphous phase and a crystalline phase is provided, it is possible to improve the joining strength between the first and second materials.

In particular, when the second material is made of Fe or an Fe alloy and the first and second materials are heat treated after roll joining, an intermediate layer which comprises a mixed phase containing an amorphous phase and a crystalline phase can be provided.

In addition, it is preferable for the intermediate layer to mainly comprise a crystalline phase.

It is possible for the cladding material to improve the joining strength between the first and second materials via the intermediate layer which mainly comprises a crystalline phase.

In particular, when the second material is made of Ti, Zr, or Hf, or when the second material is made of Fe or an Fe alloy and the first and second materials are heat treated after roll joining, an intermediate layer which mainly comprises a crystalline phase can be provided.

It is preferable for the intermediate layer to comprise aluminum as the main component and the single metal or the alloy which comprises the second material as the sub-components.

In the cladding material, the intermediate layer comprises aluminum which comprises the first material as the main component and an element which comprises the second material as the sub-components. That is, the intermediate layer comprises all the elements comprising the first and second materials. Therefore, the joining strength between the first and second materials can be more improved by an existence of the intermediate layer.

In addition, it is preferable for the intermediate layer to be formed by interfusing the element comprising the second material into the first material.

In the cladding material, since the intermediate layer can be provided by interfusing the element comprising the second material into the first material, the first and second materials are metallographically continuous. Consequently, the joining strength between the first and second materials can be improved.

It is preferable for the single metal or the alloy comprising the second material to be a metal selected from the group consisting of group 4A, 5A, 6A, 7A, and 8A elements and Cu, or an alloy comprising such a metal.

Specifically, it is preferable for the single metal or the alloy comprising the second material to be a metal selected from the group consisting of Ti, Zr, Hf, V, Nb, Ta, Cr, Mo, W, Mn, Tc, Re, Fe, Ru, Os, Co, Rh, Ir, Ni, Pd, Pt, and Cu, or an alloy comprising such a metal. In particular, it is more preferable for the single metal or the alloy comprising the second material to be a metal or an alloy which has a higher hardness and strength than those of Al or an aluminum alloy, such as Fe, an Fe alloy, Ti, Zr, Hf, Cu, a Cu alloy, Ni, and a Ni alloy. Moreover, Fe also includes so-called steel, and Fe alloys also include so-called stainless steel, such as an Fe—Cr alloy, and an Fe—Cr—Ni alloy.

In addition, in order to achieve the object, the present invention provides a manufacturing method for a cladding material comprising the steps of: superposing a first material made of aluminum or an aluminum alloy and a second material made of a single metal or an alloy, and roll joining the first and second materials under vacuum conditions wherein the joining temperature is in a range from 260 to 600° C. until the draft of the first material becomes 14% or greater.

In the manufacturing method, since the roll joining is carried out under such conditions, it is possible to realize the joining strength between the first and second materials which is larger than the tensile strength of the first material.

In the manufacturing method, it is preferable to provide an intermediate layer between the first and second materials.

In the manufacturing method, since the intermediate layer can be provided by roll joining under such conditions, it is possible to realize the joining strength between the first and second materials which is larger than the tensile strength of the first material.

In addition, it is preferable to heat treat the first and second materials under conditions wherein the heat treatment temperature is in a range from 300 to 500° C. and the heat treatment time is in a range from 10 to 60 minutes after the roll joining.

In the manufacturing method, a crystalline phase can be formed in the intermediate layer by heat treating after the roll joining; therefore, it is possible to improve the joining strength between the first and second materials.

DETAILED DESCRIPTION OF THE PREFERRED EMBODIMENTS

Figure 1:
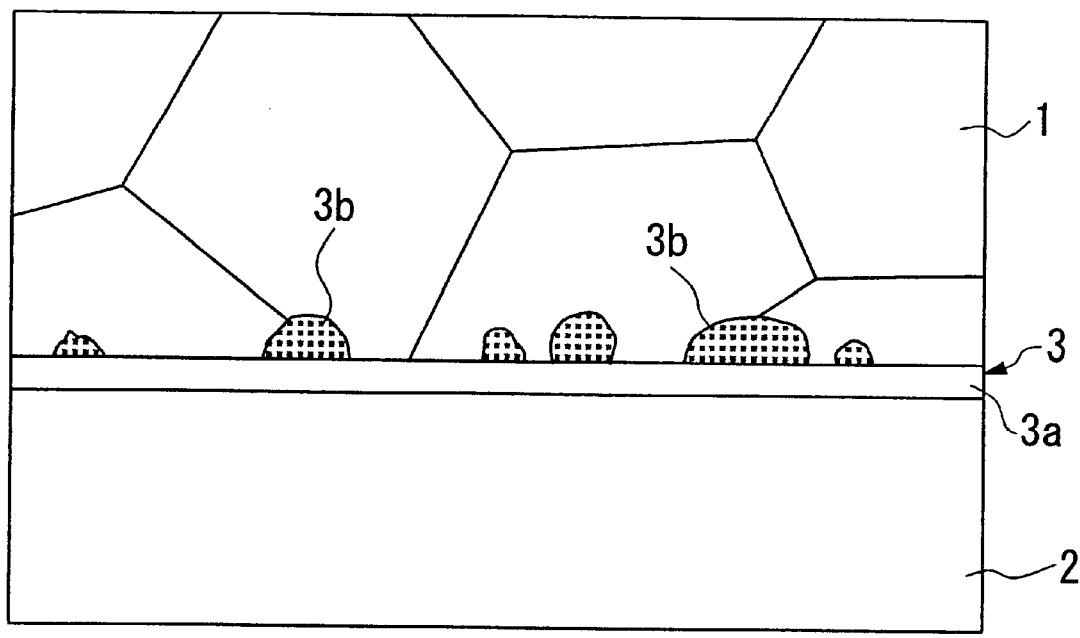
FIG. 1 is a sectional drawing showing an embodiment of the cladding material according to the present invention.

Next, embodiments of the cladding material and the manufacturing method therefor of the present invention will be explained referring to the drawings.

As described above, the cladding material of the present invention comprises: a first material which is made of aluminum or an aluminum alloy; a second material which is made of a single metal or an alloy and which is to be joined with the first material; and an intermediate layer which is provided between the first and second materials.

The aluminum alloy comprising the first material is preferably an Al—Mn alloy, an Al—Mg alloy, an Al—Si alloy, pure Al, or industrial pure Al, for example. Among these, the Al—Mn alloy is more preferable. Aluminum may contain unavoidable impurities, such as oxygen.

The second material is preferably made of a metal of group 4A, 5A, 6A, 7A, or 8A elements or Cu, or an alloy comprising such a metal.

Specifically, the second material is preferably made of Ti, Zr, Hf, V, Nb, Ta, Cr, Mo, W, Mn, Tc, Re, Fe, Ru, Os, Co, Rh, Ir, Ni, Pd, Pt, or Cu, or an alloy comprising such a metal.

In particular, it is more preferable for the single metal or the alloy comprising the second material to be a metal or an alloy which has a higher hardness and strength than those of Al or an aluminum alloy, such as Fe, an Fe alloy, Ti, Zr, Hf, Cu, a Cu alloy, Ni, and a Ni alloy.

Moreover, Fe also includes so-called steel which contains several percent of carbon, and Fe alloy also includes, for example, so-called stainless steel, such as an Fe—Cr alloy, and an Fe—Cr—Ni alloy. In addition, Ti alloy includes, for example, a Ti—Al—V alloy, and the like.

FIG. 1 is a sectional drawing showing a main part of the cladding material according to the present invention.

The cladding material comprises a first material 1, a second material 2, and an intermediate layer 3.

The intermediate layer 3 mainly comprises an amorphous phase, and is provided between the first and second materials 1 and 2.

The intermediate layer 3 which mainly comprises an amorphous phase is provided by superposing and roll joining the first and second materials 1 and 2 under vacuum conditions wherein the joining temperature is in a range from 260 to 600° C., the draft of the first material 1 is 14% or greater, and Fe or an Fe alloy is used as the metal or the alloy comprising the second material 2.

As shown in FIG. 1, the intermediate layer 3 comprises an amorphous film 3a which has a thickness in a range from about 2 to 5 nm and fine crystalline phases 3b which are deposited from the amorphous film 3a into the first material 1. The amorphous film 3a occupies a majority of the intermediate layer 3.

Each of the amorphous film 3a and the fine crystalline phases 3b comprises aluminum as the main component and the elements comprising the second material 2, such as Fe, Cr, Ni, and the like as the sub-components. The amorphous film 3a and the fine crystalline phases 3b are provided by interfusing the elements which comprise the second material 2, such as Fe, Cr, Ni, and the like into the first material 1.

Due to the existence of the intermediate layer 3, it is possible to improve the joining strength between the first and second materials 1 and 2. In particular, it is possible to realize the joining strength between the first and second materials 1 and 2 which is larger than the tensile strength of the first material 1. Therefore, the cladding material of this embodiment can be used as the material for ships and vessels.

Figure 2:
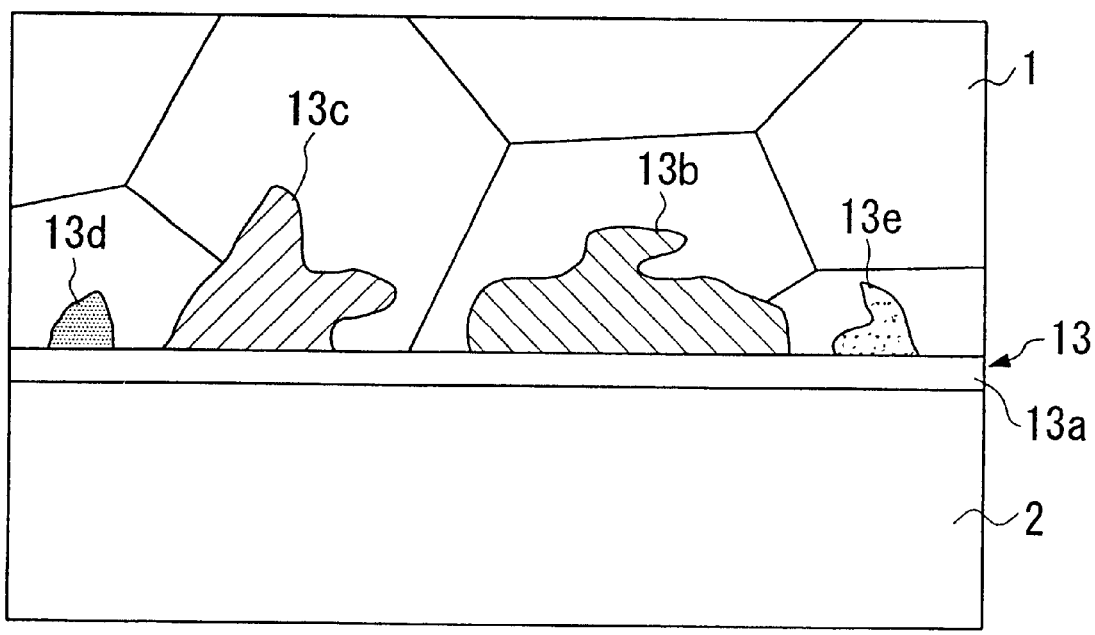
FIG. 2 is a sectional drawing showing another embodiment of the cladding material according to the present invention.

FIG. 2 is a sectional drawing showing a main part of another cladding material according to the present invention.

The cladding material comprises the first material 1, the second material 2, and an intermediate layer 13.

The intermediate layer 13 comprises a mixed phase containing an amorphous phase and a crystalline phase and is provided between the first and second materials 1 and 2.

The intermediate layer 13 which comprises a mixed phase containing an amorphous phase and a crystalline phase is provided by superposing and roll joining the first and second materials 1 and 2 under vacuum conditions wherein the joining temperature is in a range from 260 to 600° C., the draft of the first material 1 is 14% or greater, and Fe or an Fe alloy is used as the metal or the alloy comprising the second material 2; they are further heat treated under conditions wherein the heat treatment temperature is in a range from 300 to 500° C. and the heat treatment time after the roll joining is 10 minutes.

As shown in FIG. 2, the intermediate layer 13 comprises an amorphous film 13a which has a thickness in a range from about 2 to 5 nm, and crystalline phases 13b, 13c, 13d, and 13e which are deposited from the amorphous film 13a into the first material 1. The crystalline phases 13b, 13c, 13d, and 13e occupy a majority of the intermediate layer 13. The crystalline phases 13b, 13c, 13d, and 13e have a different crystal structure from that of the fine crystalline phase 3b shown in FIG. 1. It is believed that this difference is caused due to the heat treatment after the roll joining.

In addition, each of the amorphous film 13a and the crystalline phases 13b, 13c, 13d, and 13e is made of an alloy containing aluminum as the main component and the elements comprising the second material 2, such as Fe, Cr, Ni, and the like as the sub-components. The amorphous film 3a and the crystalline phases 13b, 13c, 13d, and 13e are provided by interfusing the elements comprising the second material 2, such as Fe, Cr, Ni, and the like into the first material 1. Moreover, it is believed that the compositions of the crystalline phases 13b, 13c, 13d, and 13e are different from each other.

Due to the existence of the intermediate layer 13, it is possible to improve the joining strength between the first and second materials 1 and 2. In particular, it is possible to realize the joining strength between the first and second materials 1 and 2 which is larger than the tensile strength of the first material 1. Therefore, the cladding material of this embodiment can be used as the material for ships and vessels.

Figure 3:
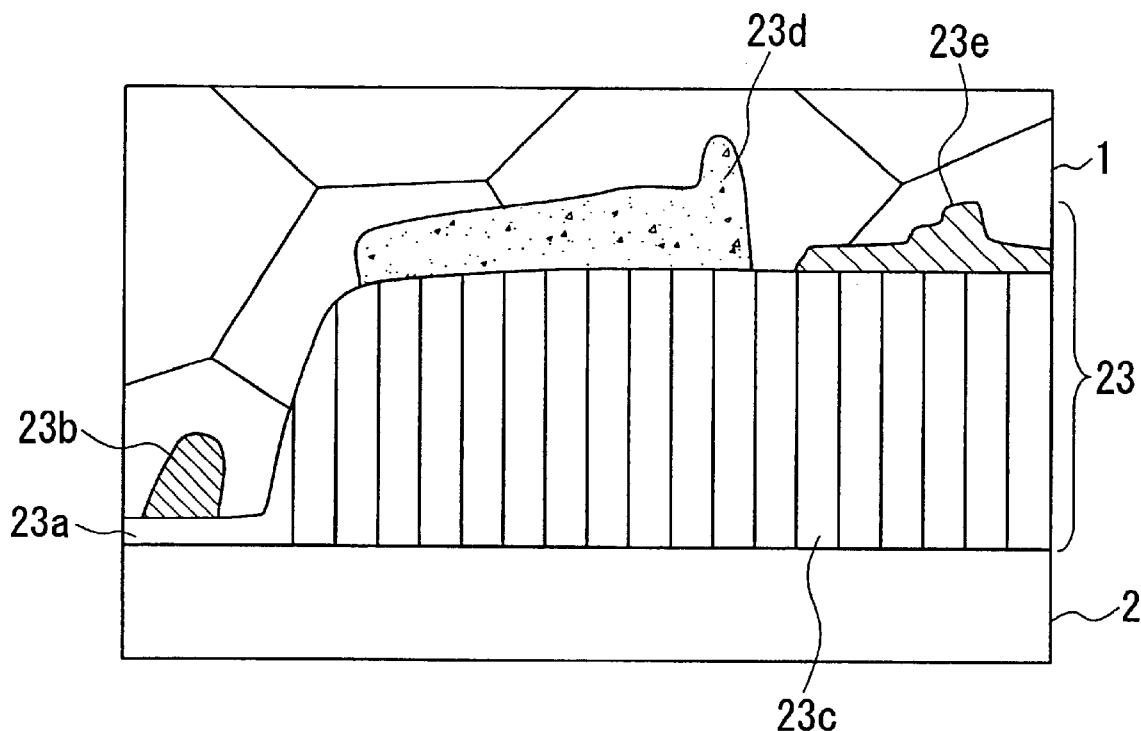
FIG. 3 is a sectional drawing showing another embodiment of the cladding material according to the present invention.

FIG. 3 is a sectional drawing showing a main part of another cladding material according to the present invention.

The cladding material comprises the first material 1, the second material 2, and an intermediate layer 23.

The intermediate layer 23 comprises a mixed phase containing an amorphous phase and a crystalline phase and is provided between the first and second materials 1 and 2.

The intermediate layer 23 which comprises a mixed phase containing an amorphous phase and a, crystalline phase is provided by superposing and roll joining the first and second materials 1 and 2 under vacuum conditions wherein the joining temperature is in a range from 260 to 600° C., the draft of the first material 1 is 14% or greater, and Fe or an Fe alloy is used as the single metal or the alloy comprising the second material 2; they are heat treated under conditions wherein the heat treatment temperature is in a range from 300 to 500° C. and the heat treatment time after the roll joining is in a range from 10 to 60 minutes.

As shown in FIG. 3, the intermediate layer 23 comprises an amorphous film 23a which has a thickness in a range from about 2 to 5 nm, a crystalline phase 23b which is deposited from the amorphous film 23a into the first material 1, a columnar crystalline phase 23c which develops from the second material 2 into the first material 1, and crystalline phases 23d and 23e which are deposited from the columnar crystalline phase 23c into the first material 1. The columnar crystalline phase 23c occupies a majority of the intermediate layer 23.

The crystalline phases 23b, 23d, and 23e have a different crystal structure from that of the fine crystalline phase 3b shown in FIG. 1. It is believed that this difference is caused due to the heat treatment after the roll joining.

In addition, the columnar crystalline phase 23c is formed by gathering many columnar crystal particles. The height of the columnar crystalline phase 23c is in a range from about 1 to 2 μm, and the width thereof is several tens of nanometers. The columnar crystalline phase 23c has a different crystal structure from that of the crystalline phases 23b, 23d, and 23e shown in FIG. 3. Such a columnar crystalline phase 23c is provided by adjusting the heat treatment temperature being in a range from 300 to 500° C. and the heat treatment time after the roll joining in a range from 10 to 60 minutes.

Each of the amorphous film 23a, the columnar crystalline phase 23c, and the crystalline phases 23b, 23d, and 23e comprises aluminum as the main component and the elements comprising the second material 2, such as Fe, Cr, Ni, and the like as the sub-component. The amorphous film 23a, the columnar crystalline phase 23c, and the crystalline phases 23b, 23d, and 23e are provided by interfusing the element comprising the second material 2, such as Fe, Cr, Ni, and the like into the first material 1. Moreover, it is believed that compositions of the crystalline phases 23b, 23d, and 23e are different from each other.

Due to the existence of the intermediate layer 23, it is possible to improve the joining strength between the first and second materials 1 and 2. In particular, it is possible to realize the joining strength between the first and second materials 1 and 2 which is larger than the tensile strength of the first material 1. Therefore, the cladding material of this embodiment can be used as the material for ships and vessels.

Figure 4:
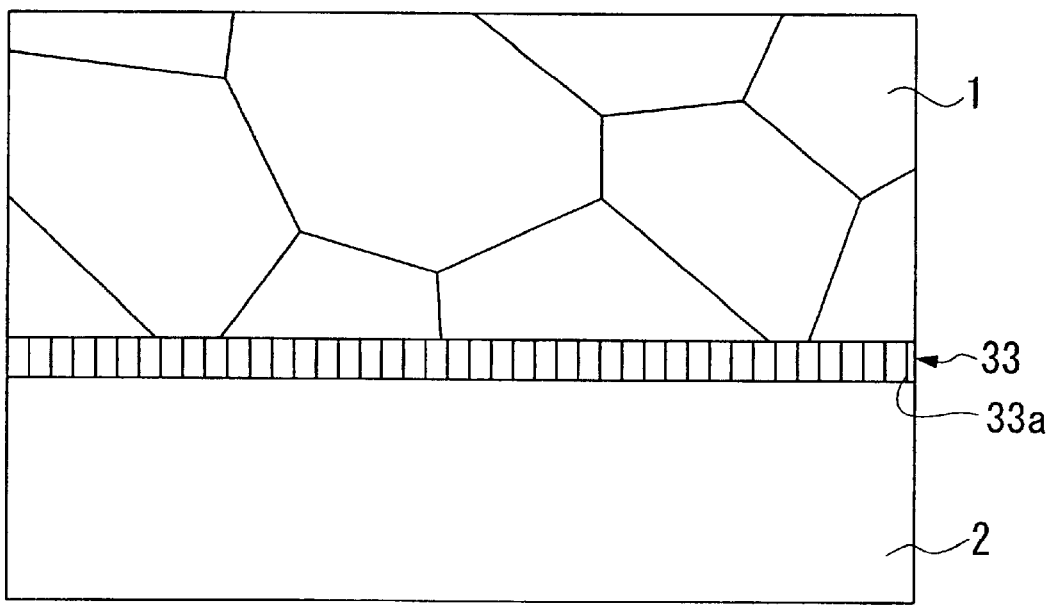
FIG. 4 is a sectional drawing showing another embodiment of the cladding material according to the present invention.

FIG. 4 is a sectional drawing showing a main part of another cladding material according to the present invention.

The cladding material comprises the first material 1, the second material 2, and an intermediate layer 33.

The intermediate layer 33 mainly comprises a crystalline phase, and is provided between the first and second materials 1 and 2.

The intermediate layer 33 which mainly comprises a crystalline phase is provided by superposing and roll joining the first and second materials 1 and 2 under vacuum conditions wherein the joining temperature is in a range from 260 to 600° C., the draft of the first material 1 is 14% or greater; and Ti, a Ti alloy, Zr or Hf is used as the single metal or the alloy comprising the second material 2.

As shown in FIG. 4, the intermediate layer 33 comprises a crystalline film 33a which has a thickness in a range from about 2 to 10 nm. The crystalline film 33a comprises aluminum as the main component and the single metal or the alloy comprising the second material 2, such as Ti, a Ti alloy, Zr, Hf, and the like as the sub-components. The crystalline film 33a is provided by interfusing the single metal or the alloy comprising the second material 2, such as Ti, a Ti alloy, Zr, Hf and the like into the first material 1.

Due to the existence of the intermediate layer 33, it is possible to improve the joining strength between the first and second materials 1 and 2. In particular, it is possible to realize the joining strength between the first and second materials 1 and 2 which is larger than the tensile strength of the first material 1. Therefore, the cladding material of this embodiment can be used as the material for ships and vessels.

Below, the manufacturing method for a cladding material of the present invention will be explained.

Figure 5:
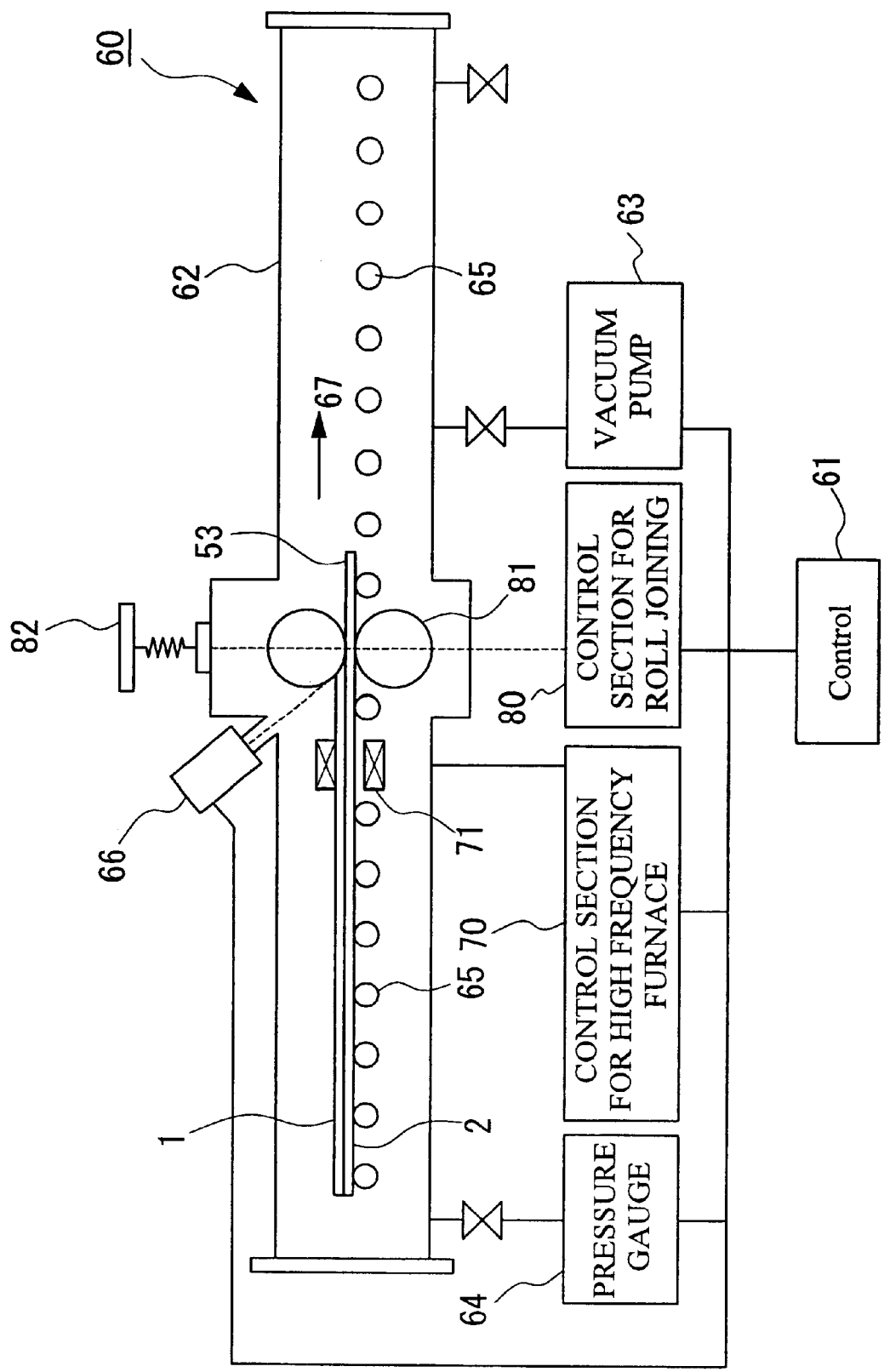
FIG. 5 shows a vacuum roll joining device used for manufacturing the cladding material according to the present invention.

FIG. 5 shows a vacuum roll joining device for manufacturing a cladding material according to the present invention.

In FIG. 5, reference number 1 denotes the first material which is, for example, an aluminum alloy plate, 2 denotes the second material which is, for example, a stainless steel plate, 53 denotes a cladding material, 60 denotes a vacuum roll joining device (below, this is referred to as the "joining device"), 61 denotes a control, 62 denotes a vacuum chamber, 63 denotes a vacuum pump, 64 denotes a pressure gauge, 65 denotes a transfer roller, 66 denotes a monitor, 70 denotes a control section for a high frequency furnace, and 80 denotes a control section for roll joining.

The control 61 controls the operation of the vacuum pump 63 based on the detected value of the pressure gauge 64 and the like, and adjusts the degree of vacuum in the vacuum chamber 62 to a certain value. In addition, the control 61 can control the entire joining device 60. For example, the control 61 can control the operation of the transfer roller 65, the monitor 66, the control section for a high frequency furnace 70, and the control section for roll joining 80.

When the cladding material 53 is manufactured by joining the first and second materials 1 and 2 using this joining device 60, the first material 1 is superposed on the second material 2, the surface of which is sufficiently cleaned, they are positioned on the transfer rollers 65 at upstream in the transferring direction (as shown by arrow 67), the vacuum chamber 62 is sealed, and then the vacuum pump 63 is operated. After the degree of vacuum in the vacuum chamber 62 reaches a certain value, for example, about $10^{-5}$ Torr ($1.33 \times 10^{-3}$ Pa), high frequency power is applied to the high frequency furnace 71 from the control section for a high frequency furnace 70, and thereby the first and second materials 1 and 2 are heated to a certain joining temperature. The joining temperature varies in response to the kinds of materials comprising the first and second materials 1 and 2, but is in a range from 260 to 500° C., for example.

After the temperature of the first and second materials 1 and 2 reaches the joining temperature, for example, about 500° C., the control section for roll joining 80 is operated, and the first and second materials 1 and 2 are made to travel on the transferring rollers 65 while they are pressed by passing between the pressure rollers 81 and 81. Thereby, the cladding material 53 is obtained by roll joining the first and second materials 1 and 2.

Moreover, the pressure of the pressure rollers 81 and 81 can be adjusted by the pressure adjusting device 82. In addition, the conditions of the first and second materials 1 and 2 passing between the pressure rollers 81 and 81 are checked by the monitor 66. When unusual circumstances arise, the operation of the device is stopped.

The joining temperature between the first and second materials 1 and 2 is preferably in a range from 260 to 600° C., and more preferably in a range from 260 to 500° C. If the joining temperature is less than 260° C., the formation of the intermediate layer is insufficient, and the joining strength decreases. In contrast, if the joining temperature is more than 600° C., the first material 1 which is made of aluminum, for example, is annealed, and the tensile strength of the first material 1 decreases. Moreover, if the joining temperature is 500° C. or less, the joining strength can be further improved.

In addition, it is preferable to roll join the first and second materials 1 and 2 until the draft of the first material 1 is 14% or greater. If the draft is less than 14%, the joining area percentage per unit area of the first material 1 with respect to the second material 2 decreases, and the joining strength decreases.

Moreover, aluminum and the like comprising the first material 1 is softer than Fe, an Fe alloy, Ti, a Ti alloy, Zr, Hf, or the like which comprises the second material 2, and it has excellent ductility. Therefore, only the first material 1 is transformed by the roll joining.

In addition, the roll joining is performed preferably in a vacuum atmosphere, specifically the pressure is preferably less than 1.33 Pa ($10^{-2}$ Torr). Furthermore, the roll joining may be performed in an inert atmosphere, such as an Ar atmosphere.

As described above, since the intermediate layer mainly comprising a crystalline phase or an amorphous phase can be provided between the first and second materials 1 and 2 by adjusting the joining temperature in a range from 260 to 600° C. in a vacuum atmosphere and the draft of the first material 1 is 14% or greater, it is possible to improve the joining strength between the first and second materials 1 and 2.

In particular, when the second material is made of Fe or an Fe alloy, as shown in FIG. 1, the intermediate layer 3 which mainly comprises an amorphous phase 3a is provided. When the second material 2 is made of Ti, a Ti alloy, Zr, or Hf, as shown in FIG. 4, the intermediate layer 33 which mainly comprises a crystalline phase 33a is provided.

In addition, the cladding material after the roll joining may be heat treated in a vacuum atmosphere wherein the heat treatment temperature is in a range from 300 to 500° C., and the heat treatment time is in a range from 10 to 60 minutes. When the cladding material is heat treated, since the intermediate layer formed by the roll joining further develops and solidifies, the joining strength between the first and second materials 1 and 2 is improved.

For example, when the cladding material after the roll joining is heat treated for 10 minutes in a range from 300 to 500° C., the intermediate layer which comprises a mixed phase containing the crystalline phases 13b, 13c, 13d, and 13e and the amorphous phase 13a is provided, as shown in FIG. 2. When the cladding material is further heat treated for 10 minutes in a range from 300 to 500° C., the intermediate layer 23 comprises a mixed phase containing the amorphous phase 23a, the crystalline phases 23b, 23d, and 23e and the columnar crystalline phase 23c, as shown in FIG. 3.

As described above, in the cladding material of the present invention, since the intermediate layer 3, 13, and 23 is provided between the first and second materials 1 and 2, it is possible to realize the joining strength between the first and second materials 1 and 2 which is larger than the tensile strength of the first material 1.

In addition, in the manufacturing method for a cladding material of the present invention, since a roll joining is performed under such conditions, the intermediate layer 3, 13, and 23 is provided between the first and second materials 1 and 2. The first and second materials 1 and 2 are joined via the intermediate layer 3, 13, and 23. Therefore, it is possible to obtain a cladding material wherein the joining strength between the first and second materials 1 and 2 is larger than the tensile strength of the first material 1.

In the following, the present invention will be explained in more detail using Examples.

EXPERIMENTAL EXAMPLE 1

An Al—Mn alloy plate having a thickness of 11 mm, a width of 80 mm, and a length of 1,000 mm and a stainless steel plate having a thickness of 25 mm, a width of 80 mm, and a length of 1,000 mm were prepared; and a joining surface of the Al—Mn alloy plate and the stainless steel plate was mirror finished, and then was degreased and dried using acetone.

Next, these plates were superposed and fixed, and positioned in the joining device shown in FIG. 5. Then, the degree of vacuum in the vacuum chamber was adjusted to $4 \times 10^{-5}$ Torr ($5.33 \times 10^{-3}$ Pa).

Next, the high frequency furnace was operated, and thereby these plates were heated to 500° C. In addition, the Al—Mn alloy plate and the stainless steel plate were roll joined under conditions wherein the roll joining speed was 10 mm/sec and the draft of the Al—Mn alloy plate was 14%, and thereby the cladding material of Example 1 was prepared.

Furthermore, the cladding material of Example 1 was heat treated under conditions wherein the degree of vacuum was $4 \times 10^{-5}$ Torr ($5.33 \times 10^{-3}$ Pa), the heat treatment temperature was 500° C. and the heat treatment time was 30 minutes, and thereby the cladding material of Example 2 was prepared.

Moreover, the Al—Mn alloy plate contains 1.05% by weight of Mn, and has the tensile strength of 150 N/mm². The stainless steel plate is so-called SUS 304L, contains 18.5% by weight of Cr, 9.7% by weight of Ni, and Fe and impurities as a remainder, and has the tensile strength of 569 N/mm².

The joining interface of the cladding materials of Examples 1 and 2 was observed using a transmission electron microscope. The observation was carried out using a test sample which was prepared by cutting off a piece having a length of 2 mm, a width of 2 mm, and a thickness of 1 mm from the prepared cladding material so as to constitute the joining interface, and mirror finishing it until the thickness thereof was about 20~30 μm.

Figure 6:
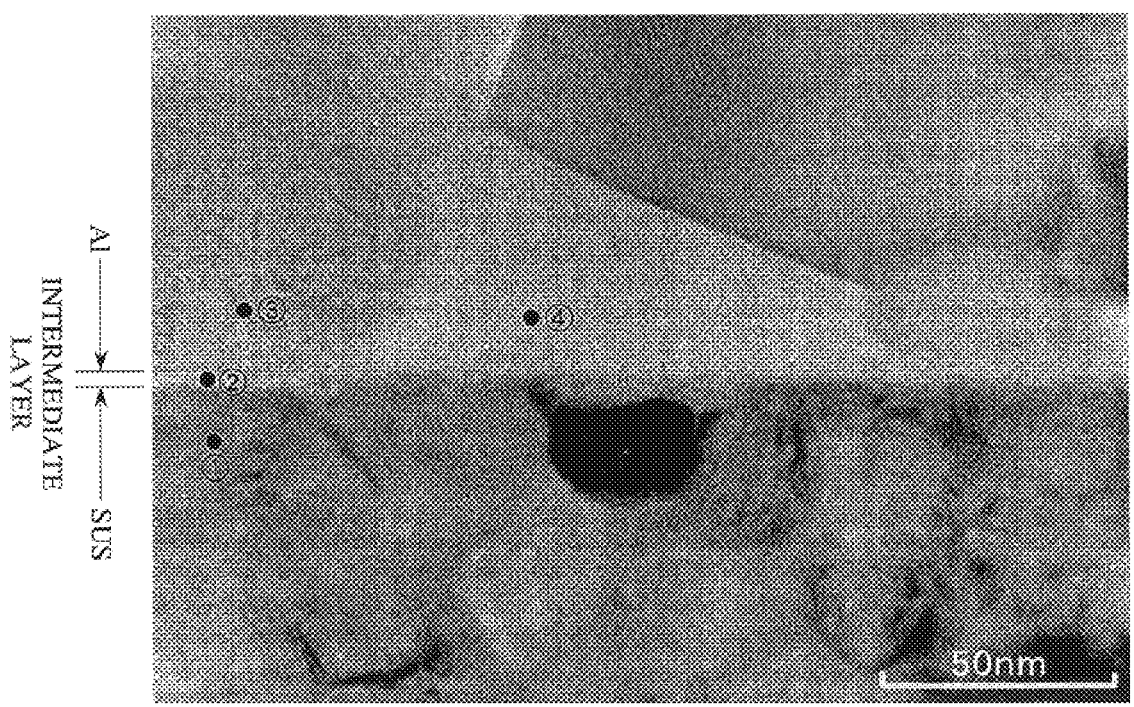
FIG. 6 is a microphotograph showing a sectional of a joining interface of the cladding material of Example 1.

A microphotograph showing a section of the joining interface of the cladding material of Example 1 is shown in FIG. 6. It can be confirmed from FIG. 6 that an intermediate layer ② is provided between the stainless steel plate (SUS) and the Al—Mn alloy plate (Al). In addition, it can be also confirmed that a mottled texture ③ is deposited in the Al—Mn alloy texture. It seems that this mottled texture ③ interfuses into the Al—Mn alloy texture and develops therein. Moreover, reference symbol ① denotes the stainless steel (SUS) texture, and ④ denotes the Al—Mn alloy (Al) texture.

Figure 7:
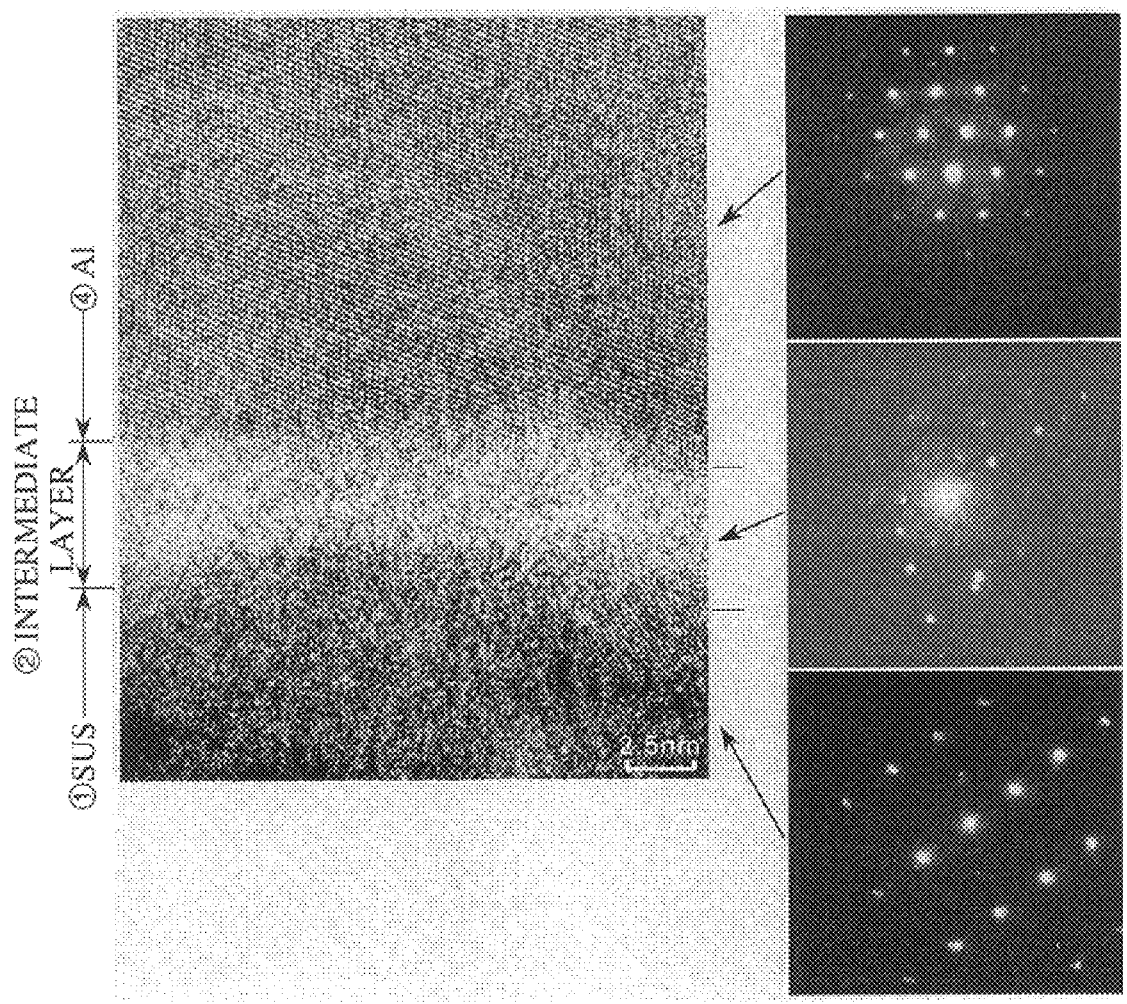
FIG. 7 is an enlarged microphotograph of FIG. 6.

FIG. 7 shows an enlarged microphotograph of the intermediate layer ②. Specifically, FIG. 7 shows an enlarged microphotograph of the stainless steel texture ①, the intermediate layer ②, and the Al—Mn alloy texture ④ on the left side, and the results of an electron beam analysis of ①, ②, and ④ on the right side. It is clear from FIG. 7 that the width of the intermediate layer ② is about 5 nm. In addition, it is also clear that, since the image of the stainless steel texture ① and the Al—Mn alloy texture ④ is clear, these textures are crystalline textures. In contrast, since the image of the intermediate layer ② is unclear, the texture comprising the intermediate layer ② is probably not a crystalline texture.

These results are supported by the results of an electron beam analysis which are shown on the right side of FIG. 7. Specifically, since the electron beam analysis images of the stainless steel texture ① and the Al—Mn alloy texture ④, which are respectively positioned in the top and bottom on the right side of FIG. 7, are clear, the stainless steel texture ① and the Al—Mn alloy texture ④ are crystalline textures. In contrast, since the electron beam analysis image of the intermediate layer ②, which is positioned in the middle on the right side of FIG. 7, is unclear, the texture of the intermediate layer ② comprises an amorphous phase.

Figure 8:
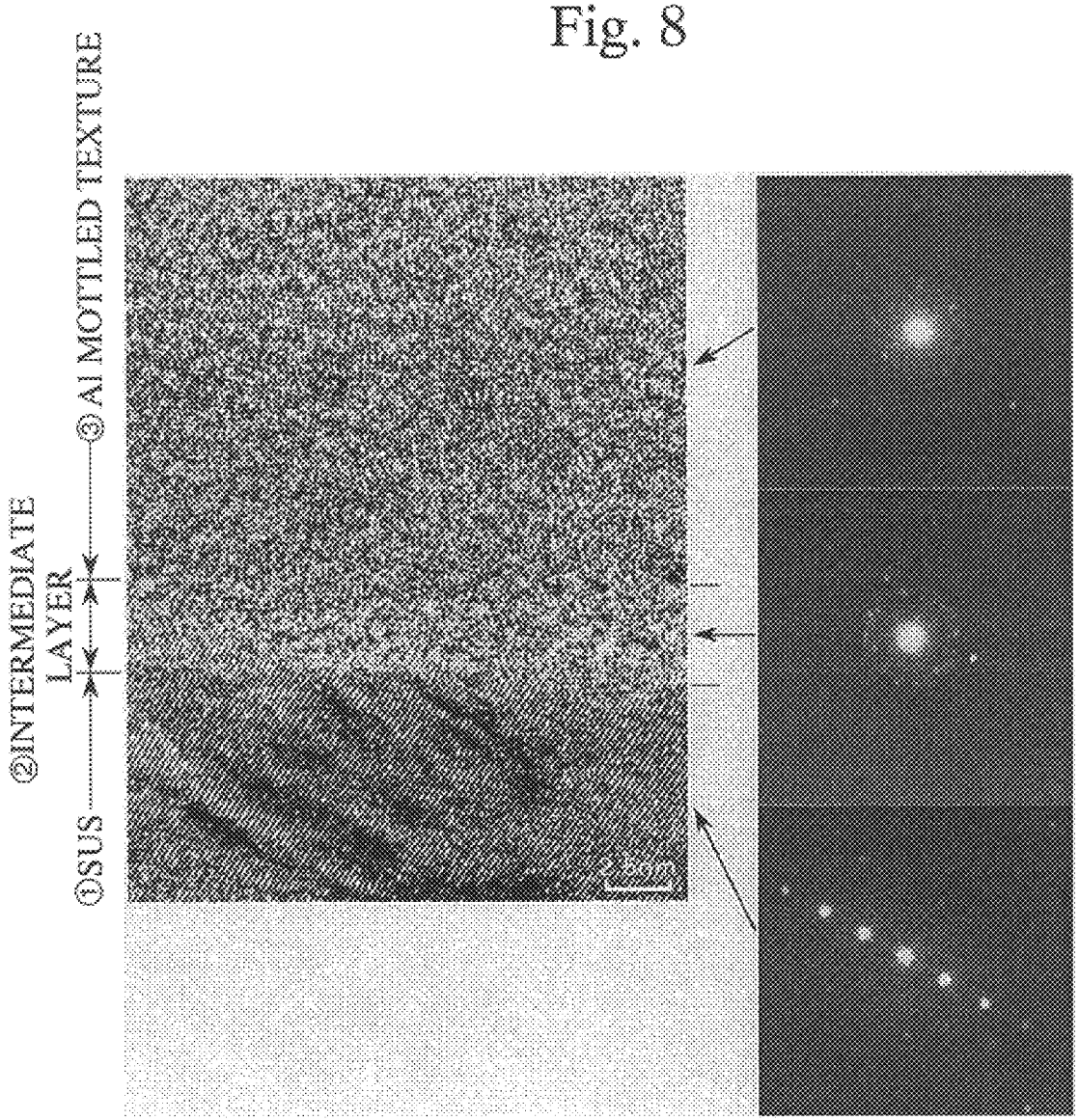
FIG. 8 is an enlarged microphotograph of FIG. 6.

FIG. 8 shows an enlarged microphotograph of the stainless steel texture ①, the intermediate layer ②, and the mottled texture ③, which are shown in FIG. 6. It is clear from FIG. 8 that a slightly irregular but clear fine crystalline texture can be observed in the image of the mottled texture ③. Based on the electron beam analysis image of this mottled texture ③, which is positioned in the top on the right side of FIG. 8, it seems that the crystalline structure of the mottled texture ③ has a slight halo shape.

As a result, it is believed that this mottled texture ③ is a mixed texture containing fine crystalline particles and an amorphous phase, or is a simple texture containing only fine crystalline particles.

Figure 9:
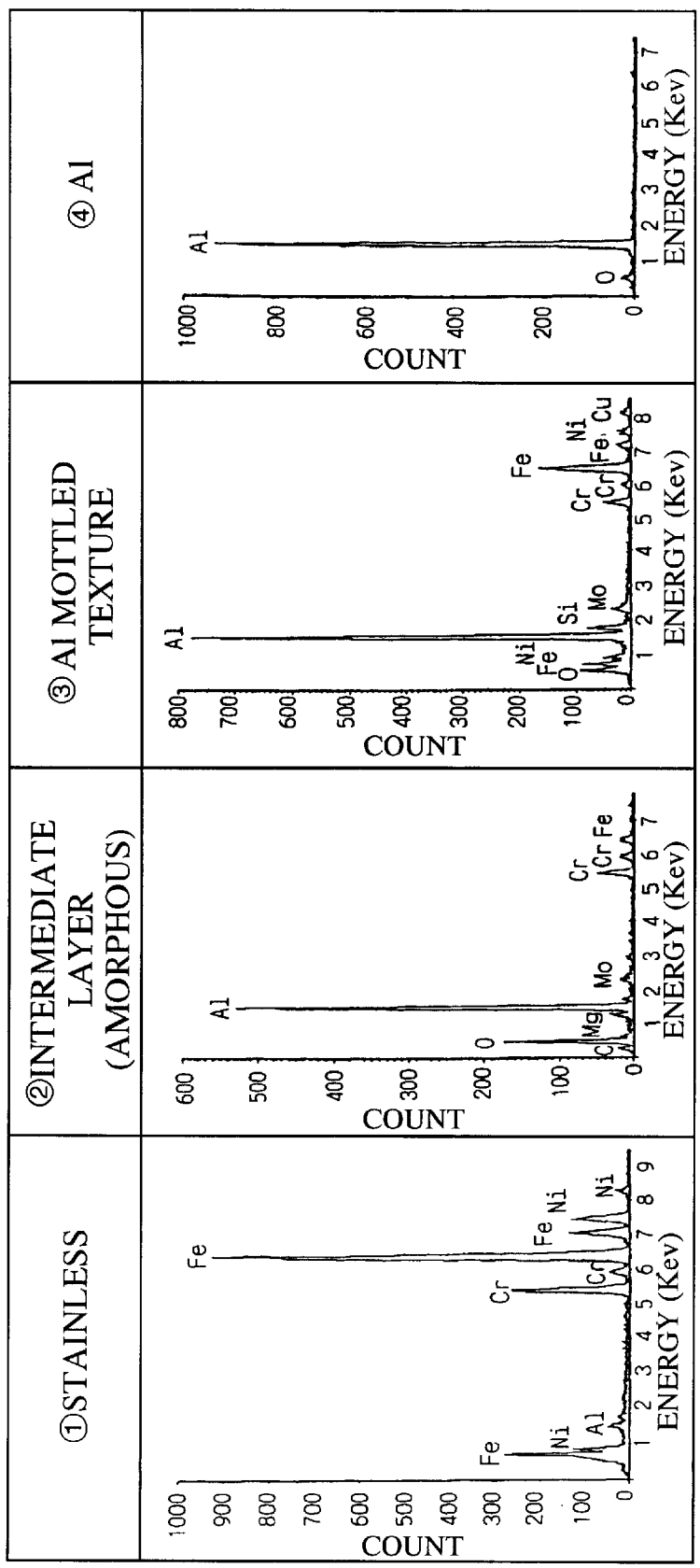
FIG. 9 shows the results of an energy dispersion type elemental analysis of the cladding material shown in FIG. 6.

FIG. 9 shows the results of an energy dispersion type elemental analysis of the stainless steel texture ①, the intermediate layer ②, the mottled texture ③, and the Al—Mn alloy texture ④, which are shown in FIG. 6. It can be confirmed from FIG. 9 that the intermediate layer ② and the mottled texture ③ comprise Al as the main component, and Fe, Cr, and Ni, which comprise the stainless steel as the sub-components. Moreover, Mo is also detected, but Mo is a residue from the sample stage made of Mo which was used for the microscopic observation.

Therefore, it is believed that the intermediate layer and the mottled texture are formed by interfusing Fe, Cr, and Ni, which comprise the stainless steel plate, into the Al—Mn alloy texture.

Figure 10:
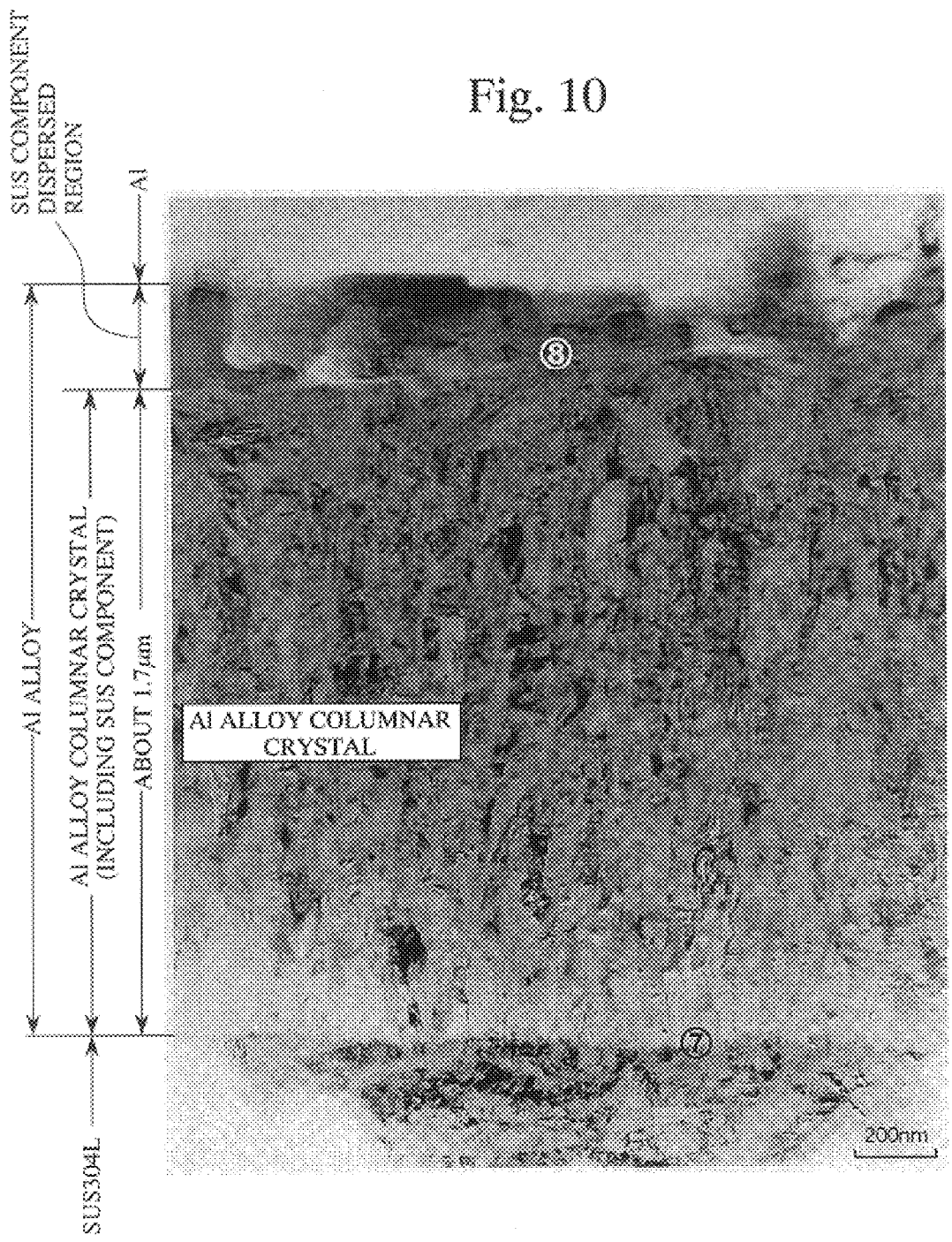
FIG. 10 is a microphotograph showing a sectional of a joining interface of the cladding material of Example 2.
Figure 11:
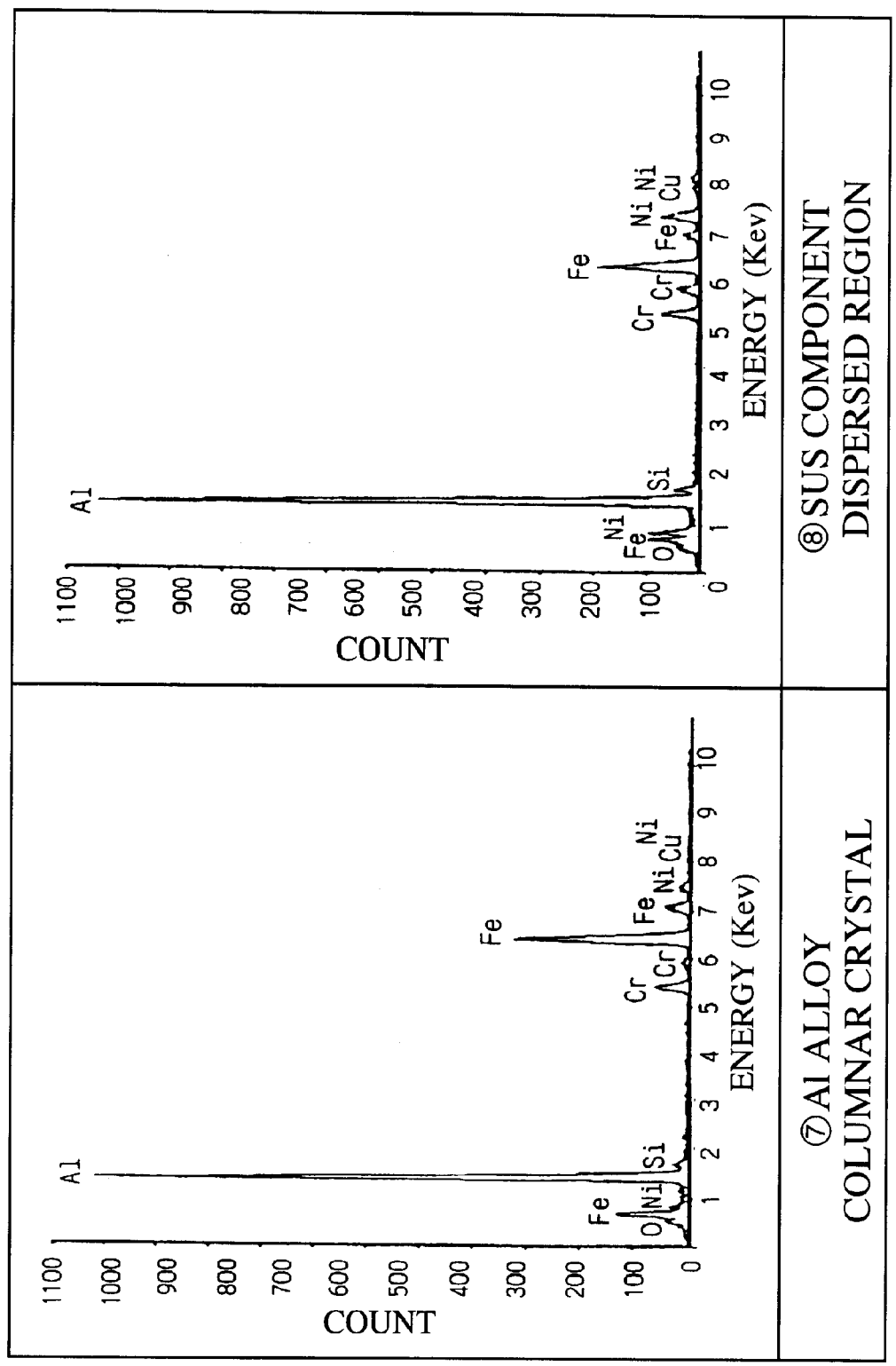
FIG. 11 shows results of an energy dispersion type elemental analysis of the cladding material shown in FIG. 10.

FIG. 10 is a microphotograph showing a section of the joining interface of the cladding material of Example 2. FIG. 11 shows the results of an energy dispersion type elemental analysis of the cladding material of Example 2.

It is clear from FIG. 10 that a columnar crystal ⑦ having a thickness of about 1.7 µm, which develops from the stainless steel plate in the Al—Mn alloy plate, is observed at the joining interface of the cladding material which is heat treated. In addition, an SUS component dispersed region ⑧ can be observed near the Al—Mn alloy plate with respect to the columnar crystal. Moreover, the columnar crystal and the SUS component dispersed region also comprise a crystalline phase.

FIG. 11 shows the results of an energy dispersion type elemental analysis of the columnar crystal and the SUS component dispersed region. It is clear from FIG. 11 that the columnar crystal and the SUS component dispersed region comprise Al as the main component, and Fe, Cr, and Ni, which comprise the stainless steel plate as the sub-components.

Therefore, it is believed that the columnar crystal and the SUS component dispersed region, which are shown in FIG. 10, are formed by crystallizing the intermediate layer which is shown in FIG. 7, and interfusing the elements comprising the stainless steel plate.

EXPERIMENTAL EXAMPLE 2

Al—Mn alloy plates having a thickness of 11 mm, a width of 80 mm, and a length of 1,000 mm, and a stainless steel plate, a Ti alloy plate, a steel plate, and a Zr plate, each having a thickness of 25 mm, a width of 80 mm, and a length of 1,000 mm, were prepared, and a joining surface thereof was mirror finished and then was degreased and dried using acetone.

Next, the Al—Mn alloy plate and each of the other plates were superposed and fixed respectively, and positioned in the joining device shown in FIG. 5. Then, the degree of vacuum in the vacuum chamber was adjusted to $4 \times 10^{-5}$ Torr ($5.33 \times 10^{-3}$ Pa).

Next, the high frequency furnace was operated, and thereby these plates were heated to 500° C. In addition, the Al—Mn alloy plate and each of the other plates were roll joined under conditions wherein the roll joining speed was 10 mm/sec, and the draft of the Al—Mn alloy plate was in a range from 5 to 30%, and thereby the cladding materials were prepared.

Moreover, the Al—Mn alloy plate contains 1.05% by weight of Mn, and has the tensile strength of 150 N/mm² (98 N/mm² after annealing). The stainless steel plate is so-called SUS 304L, contains 18.5% by weight of Cr, 9.7% by weight of Ni, and Fe and impurities as the remainder, and has the tensile strength of 569 N/mm². The Ti alloy plate contains 6% by weight of Al, 4% by weight of V, and Ti and impurities as the remainder, and has the tensile strength of 900 N/mm². The Zr plate contains unavoidable impurities, and has the tensile strength of 420 N/mm².

A test sample was obtained by cutting off a piece having a length of 10 mm, a width of 10 mm, and a thickness equal to the thickness of the cladding material from the prepared cladding material. Using the test samples, a tensile test was carried out under conditions wherein the speed of testing rate of stressing was 0.5 mm/min, the temperature was room temperature. The results are shown in FIGS. 12 to 15.

Figure 12:
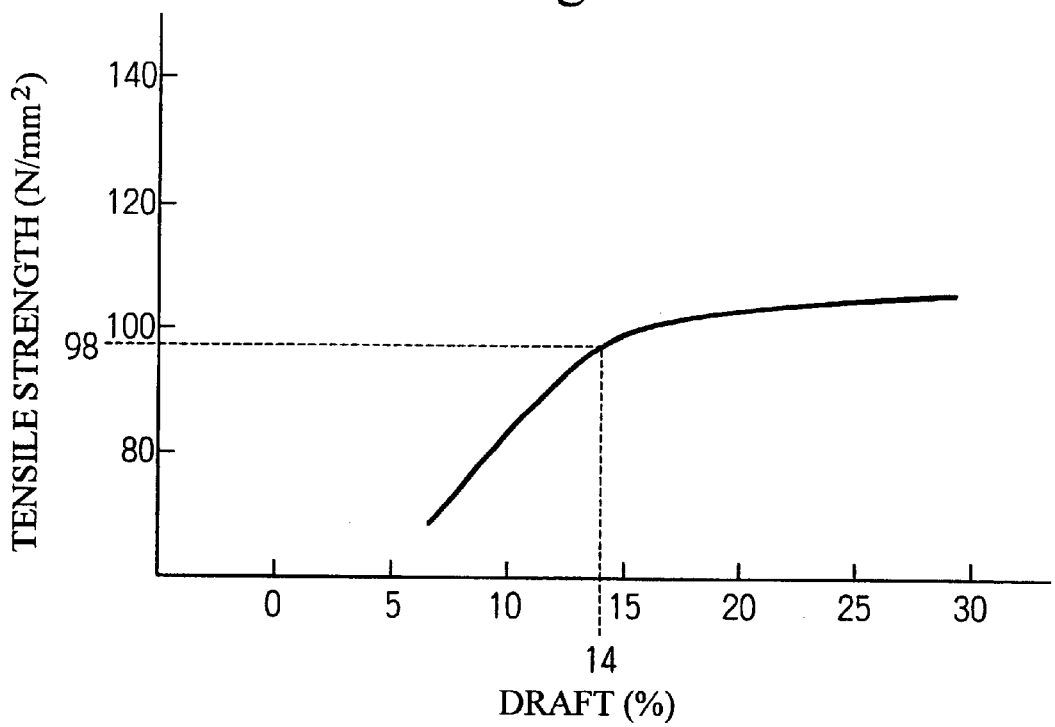
FIG. 12 is a graph showing the relationship between the draft and the tensile strength of a cladding material comprising an Al—Mn alloy plate and a stainless steel plate.
Figure 13:
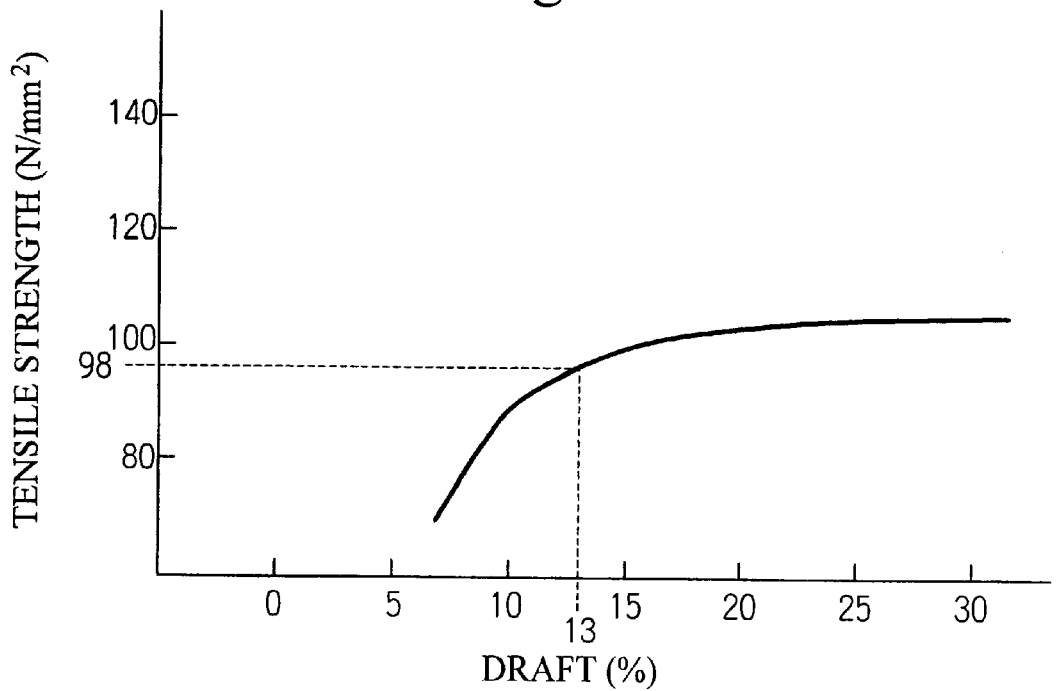
FIG. 13 is a graph showing the relationship between the draft and the tensile strength of a cladding material comprising an Al—Mn alloy plate and a Ti alloy plate.
Figure 14:
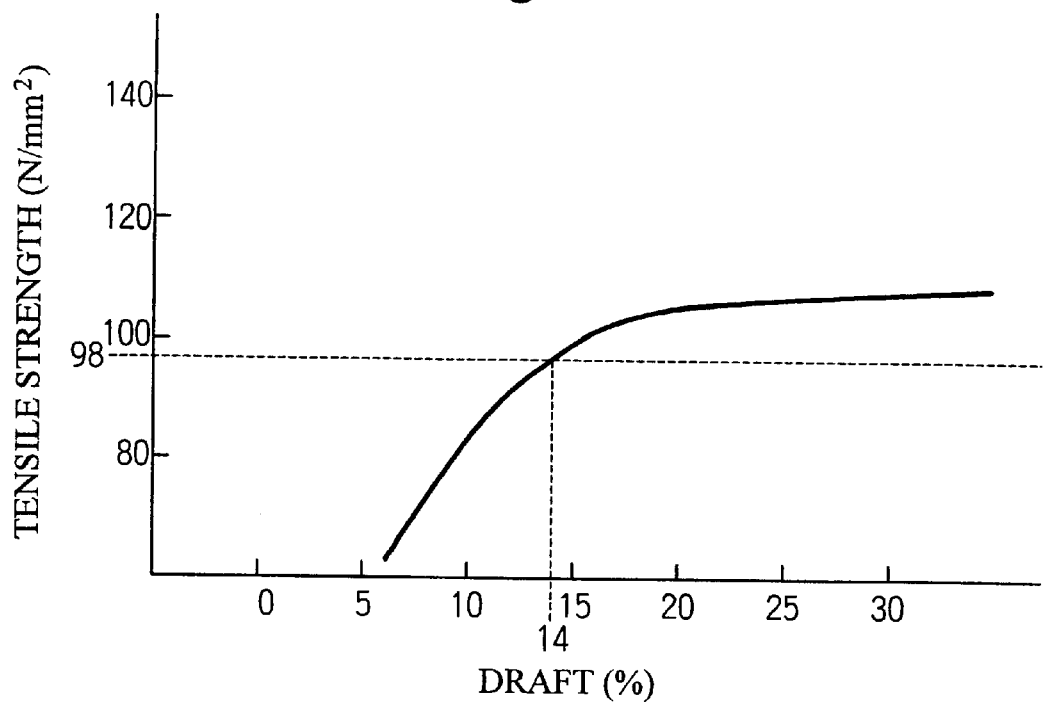
FIG. 14 is a graph showing the relationship between the draft and the tensile strength of a cladding material comprising an Al—Mn alloy plate and a steel plate.
Figure 15:
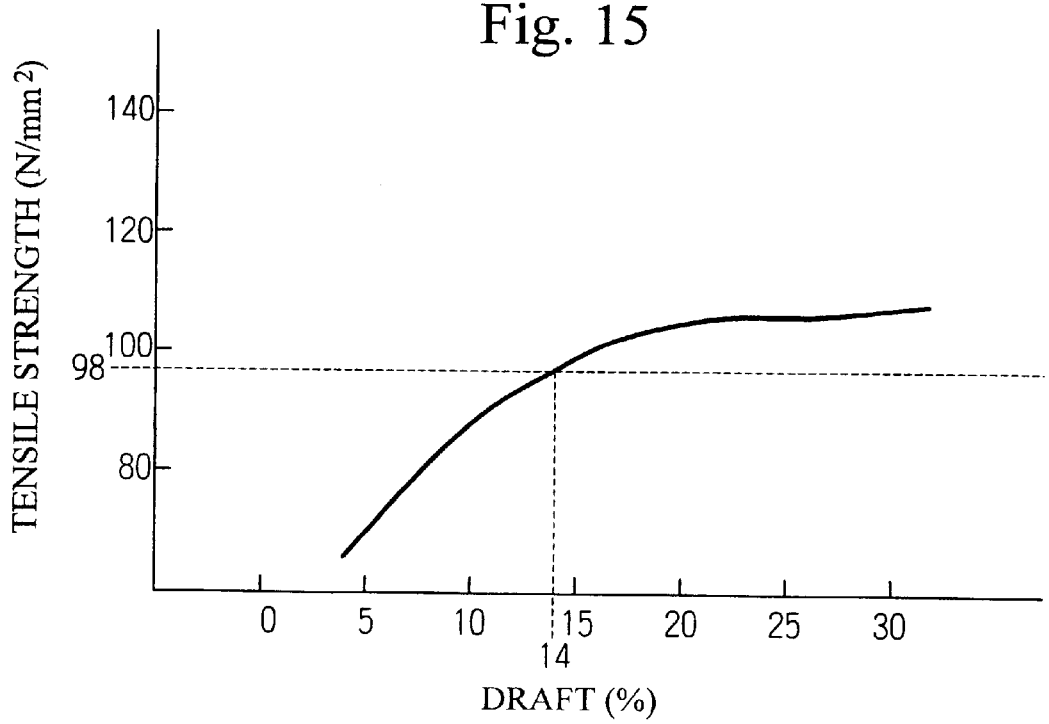
FIG. 15 is a graph showing the relationship between the draft and the tensile strength of a cladding material comprising an Al—Mn alloy plate and a Zr plate.

FIGS. 12 to 15 are graphs showing the relationship between the draft of the Al—Mn alloy plate and the tensile strength of the cladding materials. Specifically, FIG. 12 shows the relationship of the cladding material comprising the Al—Mn alloy plate and the stainless steel plate. FIG. 13 shows the relationship of the cladding material comprising the Al—Mn alloy plate and the Ti alloy plate. FIG. 14 shows the relationship of the cladding material comprising the Al—Mn alloy plate and the steel plate. FIG. 15 shows the relationship of the cladding material comprising the Al—Mn alloy plate and the Zr plate.

As shown in FIGS. 12 to 15, all of the cladding materials comprising the stainless steel plate, the Ti alloy plate, the steel plate, and the Zr plate have the tensile strength of 98 N/mm² or greater when the draft of the Al—Mn alloy plate is 14% or greater. As explained above, the tensile strength of the Al—Mn alloy plate is 98 N/mm². Therefore, when the draft of the Al—Mn alloy plate is 14% or greater, the joining strength of the cladding material is larger than the tensile strength of the Al—Mn alloy plate.

Moreover, when the draft of the Al—Mn alloy plate is less than 14%, the cladding material breaks at the joining interface thereof. In contrast, when it is 14% or greater, the Al—Mn alloy plate itself breaks. Based on these results, it is clear that when the draft of the Al—Mn alloy plate is 14% or greater, the joining strength of the cladding material is larger than the tensile strength of the Al—Mn alloy plate.

Next, in order to examine the conditions of the joining interface of the cladding material, the test sample was shaped such that a break would be generated at the joining interface, and the tensile test was performed using the test sample. The test sample broke at the joining interface. Then, the conditions of the broken joining interface were examined. Specifically, a cladding material comprising an Al—Mn alloy plate having a draft in a range from 7 to 20% and a stainless steel plate was used. The test sample was obtained by cutting off a piece having a length of 10 mm, a width of 10 mm, and a thickness equal to the thickness of the cladding material from the cladding material. That is, this test sample comprises the joining interface of the cladding material. Then, the test sample was ground such that the materials to be joined tapered as the distance to the joining interface decreased, and thereby a notched test sample was obtained. A tensile test was performed using the notched test sample under conditions wherein the speed of testing rate of stressing was 0.5 mm/min and the temperature was room temperature. As a result, the notched test sample broke at the joining interface. The joining interface of the stainless steel plate which was exposed by the break was observed by a scanning electron microscope, and then a reflected electron image of the join face was photographed. Based on the reflected electron image, the Al adhesion conditions at the joining interface were examined.

As explained above, based on the results of Experimental Example 1, it is believed that the intermediate layer is formed by interfusing the stainless steel components into the Al—Mn alloy plate, and roll joining the materials to be joined. Therefore, it is assumed that the face, to which Al is adhered, is a genuine joining surface to which the materials to be joined are actually joined.

Therefore, the percentage of the area, to which Al is adhered with respect to the area of the joining surface is defined as the joining percentage. The relationship between the joining percentage and the draft of the Al—Mn alloy plate was examined. The results are shown in FIG. 16.

Figure 16:
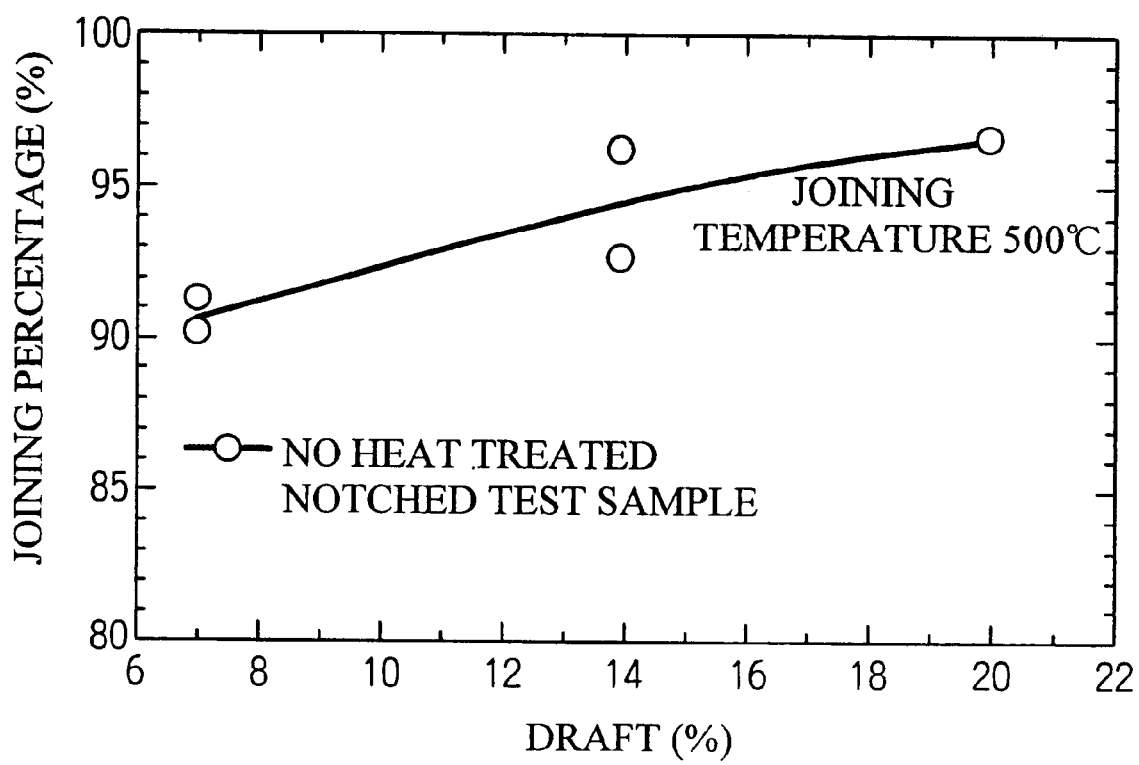
FIG. 16 is a graph showing the relationship between the joining percentage and the draft of a cladding material comprising an Al—Mn alloy plate and a stainless steel plate.

As shown in FIG. 16, the joining percentage increases with an increase in the draft of the Al—Mn alloy plate. In particular, it is confirmed that when the draft is 14%, the joining percentage is about 94%. In other words, it is confirmed that the percentage of the area of the genuine joining surface with respect to the area of the joining surface increases with an increase in the draft.

As explained above, the percentage of the area of the genuine joining surface increases with an increase in the draft, in particular, the joining percentage is 94% or greater by realizing a draft of the Al—Mn alloy plate of 14% or greater. Therefore, it is believed that the tensile strength of the cladding material is larger than the tensile strength of the Al—Mn alloy plate.

EXPERIMENTAL EXAMPLE 3

Several cladding materials were prepared in a manner identical to that of Experimental Example 2, except that the draft of the Al—Mn alloy plate was 15%, and the joining temperature was in a range from 200 to 600° C.

A test sample was obtained by cutting off a piece having a length of 10 mm, a width of 10 mm, and a thickness equal to the thickness of the cladding material from the prepared cladding material. Using the test samples, a tensile test was carried out under conditions wherein the speed of testing rate of stressing was 0.5 mm/min, and the temperature was room temperature. The results are shown in FIGS. 17 to 20.

Figure 17:
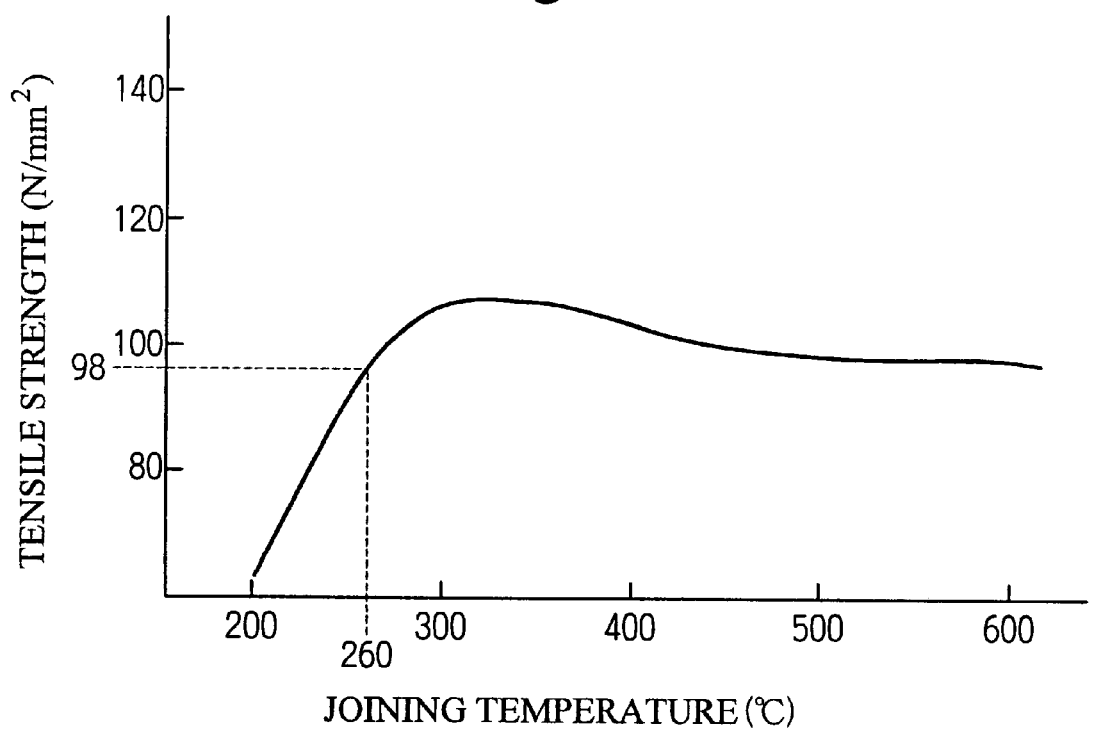
FIG. 17 is a graph showing the relationship between the joining temperature and the tensile strength of a cladding material comprising an Al—Mn alloy plate and a stainless steel plate.
Figure 18:
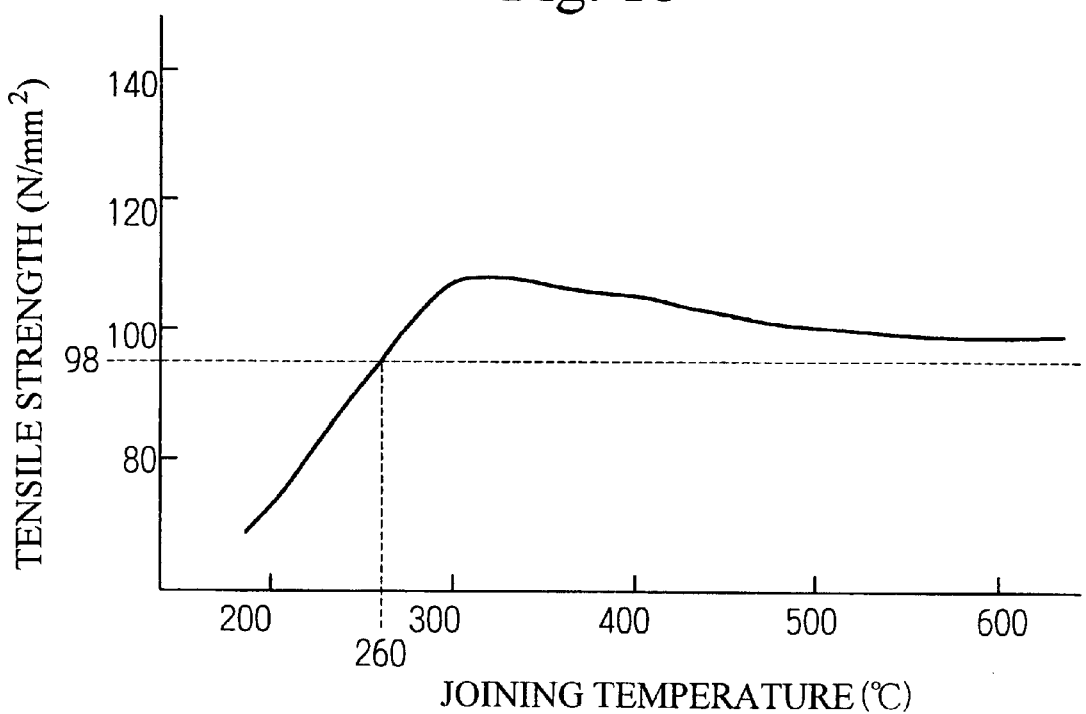
FIG. 18 is a graph showing the relationship between the joining temperature and the tensile strength of a cladding material comprising an Al—Mn alloy plate and a Ti alloy plate.
Figure 19:
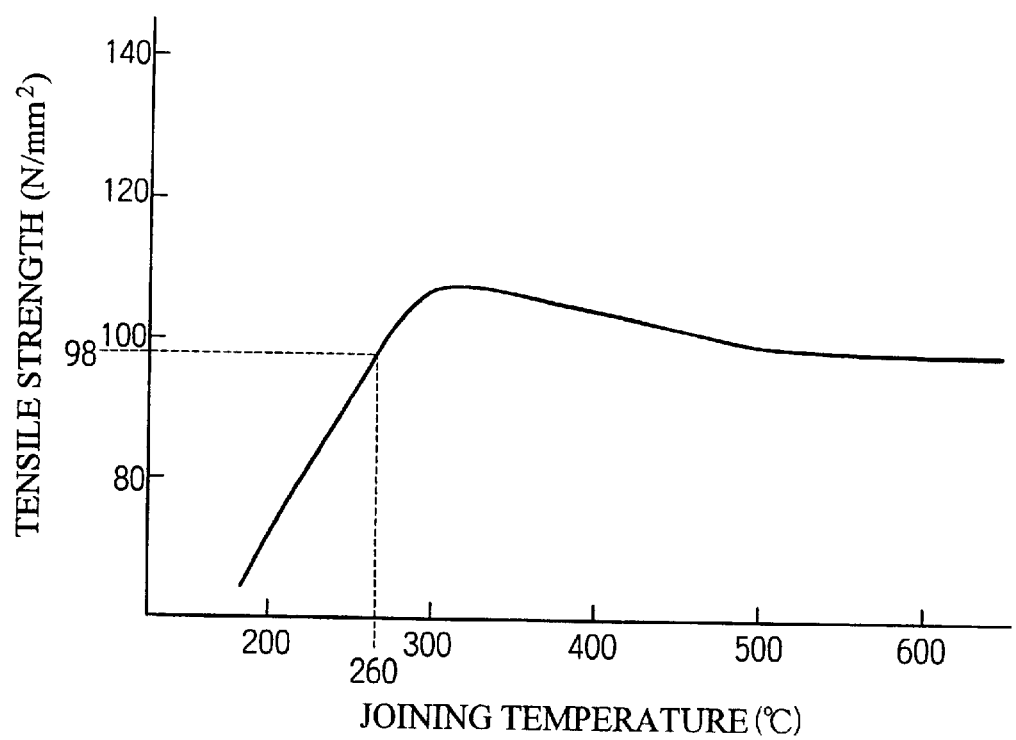
FIG. 19 is a graph showing the relationship between the joining temperature and the tensile strength of a cladding material comprising an Al—Mn alloy plate and a steel plate.
Figure 20:
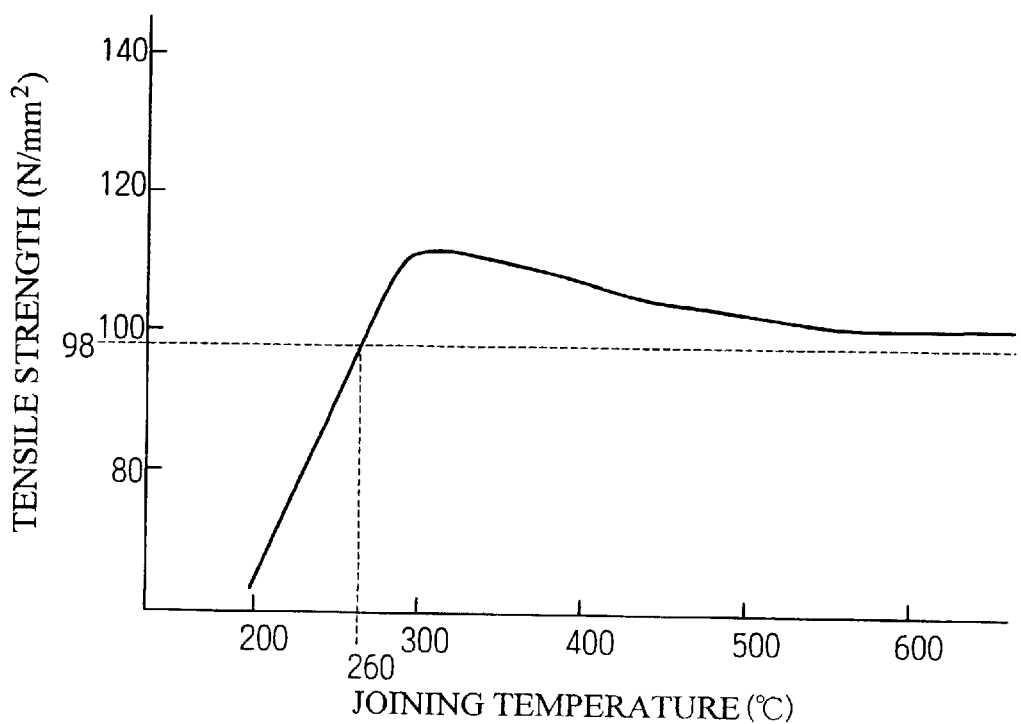
FIG. 20 is a graph showing the relationship between the joining temperature and the tensile strength of a cladding material comprising an Al—Mn alloy plate and a Zr plate.

FIGS. 17 to 20 are graphs showing the relationship between the joining temperature and the tensile strength of the cladding materials. Specifically, FIG. 17 shows the relationship of the cladding material comprising the Al—Mn alloy plate and the stainless steel plate. FIG. 18 shows the relationship of the cladding material comprising the Al—Mn alloy plate and the Ti alloy plate. FIG. 19 shows the relationship of the cladding material comprising the Al—Mn alloy plate and the steel plate. FIG. 20 shows the relationship of the cladding material comprising the Al—Mn alloy plate and the Zr plate.

As shown in FIGS. 17 to 20, all of the cladding materials comprising the stainless steel plate, the Ti alloy plate, the steel plate, and the Zr plate have the tensile strength of 98 N/mm² or greater when the joining temperature is 260° C. or greater. Moreover, when a break was generated, the Al—Mn alloy plate itself broke. As explained above, the tensile strength of the Al—Mn alloy plate is 98 N/mm. Therefore, it is believed that since when the joining temperature is 260° C. or greater, the joining strength of the cladding material is larger than the tensile strength of the Al—Mn alloy plate, and therefore the Al—Mn alloy plate itself breaks.

In addition, as shown in FIGS. 17 to 20, when the joining temperature is in a range from 300 to 350° C., the tensile strength of the cladding material is the largest. When it is more than 350° C., the tensile strength of the cladding material gradually decreases, and reaches about 100 N/mm². It is believed that since the Al—Mn alloy plate is annealed as the joining temperature increases and the influence of work hardening decreases, the tensile strength of the cladding material gradually decreases with an increase in the joining temperature. Moreover, since when the joining temperature is more than 600° C., the Al—Mn alloy plate softens, and therefore the tensile strength suddenly decreases. In contrast, when the joining temperature is less than 260° C., the cladding material breaks at the tensile strength of less than 98 N/mm², and the break is generated at the joining interface. It is believed that when the joining temperature is less than 260° C., the intermediate layer is insufficiently formed, therefore, the tensile strength at the joining interface decreases, and the break is generated at the joining interface.

Therefore, it can be understood that when the joining temperature is in a range from 260 to 600° C., the tensile strength of the joining interface is larger than the tensile strength of the Al—Mn alloy plate, and therefore the cladding material has an excellent joining strength.

EXPERIMENTAL EXAMPLE 4

Several cladding materials were prepared in a manner identical to that of Experimental Example 2, except that the draft of the Al—Mn alloy plate was 15%.

In this Experimental Example, the cladding materials were heat treated under vacuum conditions wherein the heat treatment temperature was 200, 300, 400, and 500° C., and the heat treatment time was 0, 10, 30, and 60 minutes.

A test sample was obtained by cutting off a piece having a length of 10 mm, a width of 10 mm, and a thickness equal to the thickness of the cladding material from the cladding material which was heat treated. Using the test samples, a tensile test was carried out under conditions wherein the speed of testing rate of stressing was 0.5 mm/min, and the temperature was room temperature. The results are shown in FIGS. 21 and 22.

Figure 21:
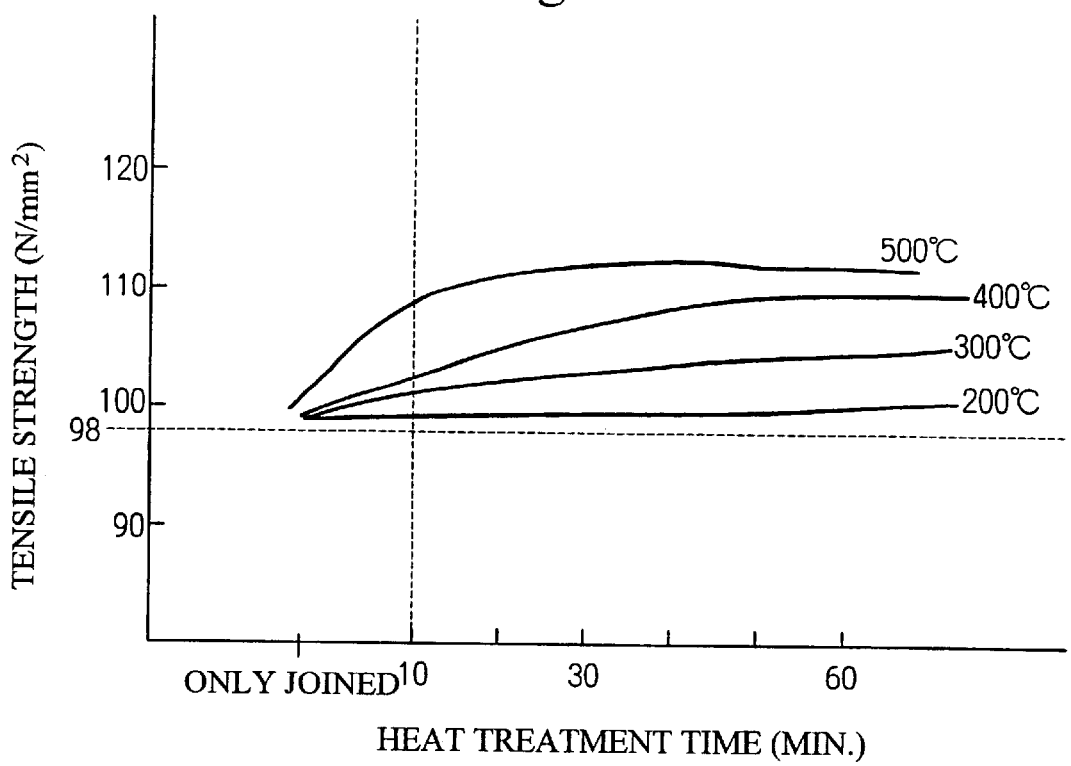
FIG. 21 is a graph showing the relationship between the heat treatment time and the tensile strength of a cladding material comprising an Al—Mn alloy plate and a stainless steel plate.
Figure 22:
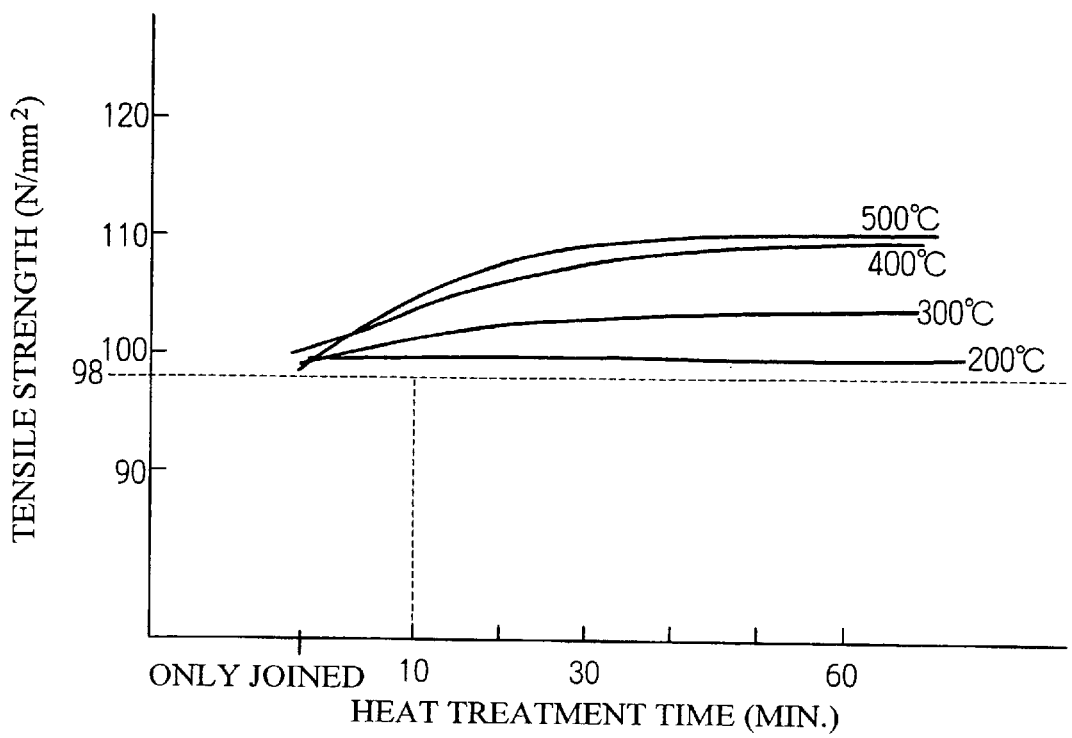
FIG. 22 is a graph showing the relationship between the heat treatment time and the tensile strength of a cladding material comprising an Al—Mn alloy plate and a Ti alloy plate.

FIGS. 21 and 22 shows the relationship between the heat treatment time and the tensile strength of the cladding materials. Specifically, FIG. 21 shows the relationship of the cladding material comprising the Al—Mn alloy plate and the stainless steel plate. FIG. 22 shows the relationship of the cladding material comprising the Al—Mn alloy plate and the Ti alloy plate. Moreover, in FIGS. 21 and 22, 200° C., 300° C., 400° C., and 500° C. denote the heat treatment temperature, and "only joined" means that no heat treatment was carried out.

As shown in FIGS. 21 and 22, when the heat treatment temperature is in a range from 300 to 500° C. and the heat treatment time is 10 minutes or greater, the tensile strength of the cladding material is 100 N/mm² or greater. In addition, the tensile strength increases with an increase in the heat treatment temperature. In particular, when the heat treatment temperature is 500° C. and the heat treatment time is 30 minutes or greater, the tensile strength is more than 110 N/mm².

As explained above, based on the results of Experimental Example 1, it can be confirmed that the stainless steel components or the Ti alloy components interfuse into the Al—Mn alloy plate with an increase in the heat treatment time, and thereby the crystalline phases are deposited in the intermediate layer. Therefore, it is believed that the tensile strength of the cladding material increases with an increase in the heat treatment temperature.

In contrast, when the heat treatment temperature is 200° C. and the heat treatment time is long, the tensile strength does not vary practically. It is believed that since the heat treatment temperature is relatively low, the stainless steel components or the Ti alloy components interfuse insufficiently, and the crystalline phase is not formed practically in the intermediate layer.

Figure 23:
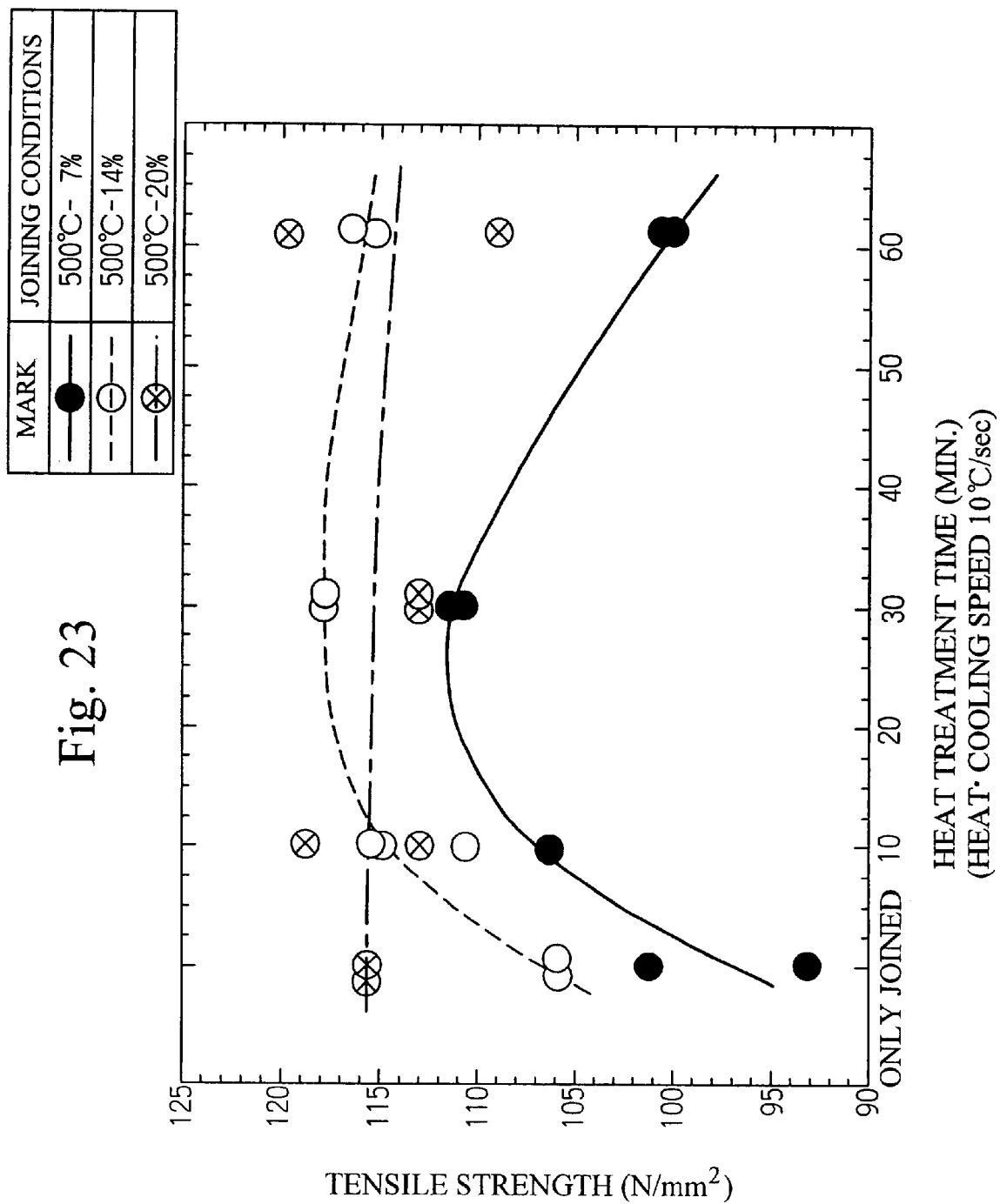
FIG. 23 is a graph showing the relationship between the heat treatment time and the tensile strength of a cladding material comprising an Al—Mn alloy plate and a stainless steel plate.

Next, the cladding materials were prepared by roll joining the Al—Mn alloy plate and the stainless steel plate under conditions wherein the joining temperature was 500° C. and the draft of the Al—Mn alloy plate was 7, 14, and 20%. Furthermore, the cladding materials were heat treated under conditions wherein the heat treatment temperature was 500° C., and the heat treatment time was in a range from 0 to 60 minutes. Next, the tensile strength of the cladding materials was measured. The results are shown in FIG. 23. Moreover, "only joined" in FIG. 23 means that no heat treatment was carried out.

As shown in FIG. 23, the cladding materials, which were prepared under conditions wherein the draft of the Al—Mn alloy plate was 14% or 20% and the heat treatment time was 10 minutes or greater, have the tensile strength of 100 N/mm$^2$ or greater. For heat treatment times of more than 10 minutes and less than 60 minutes, the tensile strength of the cladding material is substantially the same. In addition, it is confirmed that when the heat treatment time is 30 minutes, the dispersion of the tensile strength is small in all the cladding materials.

In contrast, in the cladding material in which the draft of the Al—Mn alloy plate is 7%, when the heat treatment time is 10 minutes or greater, the tensile strength of the cladding material is more than 100 N/mm$^2$, similar to the cladding materials in which the draft of the Al—Mn alloy plate is 14 or 20%. However, when the heat treatment time is more than 30 minutes, the tensile strength of the cladding material suddenly decreases.

Therefore, since a cladding material having a stable joining strength can be obtained, the heat treatment temperature is most preferably 500° C., and the heat treatment time is most preferably 30 minutes.

What is claimed is:

1. A cladding material comprising:
    a first material to be joined which is made of aluminum or an aluminum alloy;
    a second material to be joined which is made of a single metal or an alloy and which is to be joined with said first material to be joined; and
    an intermediate layer which is provided between said first material to be joined and said second material to be joined.

2. A cladding material wherein a first material to be joined which is made of aluminum or an aluminum alloy and a second material to be joined which is made of a single metal or an alloy are roll joined under vacuum conditions wherein the joining temperature is in a range from 260 to 600° C., and the draft of said first material to be joined is 14% or greater; and an intermediate layer is provided between said first material to be joined and said second material to be joined.

3. A cladding material according to claim 2, wherein said cladding material is heat treated at 300 to 500° C. for 10 to 60 minutes after said roll joining.

4. A cladding material according to claim 1, wherein said intermediate layer mainly comprises an amorphous phase.

5. A cladding material according to claim 1, wherein said intermediate layer comprises a mixed phase containing an amorphous phase and a crystalline phase.

6. A cladding material according to claim 1, wherein said intermediate layer mainly comprises a crystalline phase.

7. A cladding material according claim 1, wherein said intermediate layer comprises aluminum as the main component and the elements comprising said second material to be joined as the sub-components.

8. A cladding material according to claim 1, wherein said intermediate layer is formed by interfusing said elements comprising said second material to be joined into said first material to be joined.

9. A cladding material according to claim 1, wherein said second material to be joined is made of a metal selected from the group consisting of 4A, 5A, 6A, 7A, and 8A elements and Cu, or an alloy comprising said metal.

10. A cladding material according to claim 1, wherein said second material to be joined is made of a metal selected from the group consisting of Ti, Zr, Hf, V, Nb, Ta, Cr, Mo, W, Mn, Tc, Re, Fe, Ru, Os, Co, Rh, Ir, Ni, Pd, Pt, and Cu, or an alloy comprising said metal.

11. A cladding material according to claim 1, wherein said second material to be joined is made of a metal or an alloy which has a higher hardness and strength than those of Al or an aluminum alloy.

12. A cladding material according to claim 1, wherein said second material to be joined is made of a metal or an alloy selected from the group consisting of Fe, an Fe alloy, Ti, Zr, Hf, Cu, a Cu alloy, Ni, and a Ni alloy.

13. A manufacturing method for a cladding material comprising the steps of:
    superposing a first material to be joined made of aluminum or an aluminum alloy and a second material to be joined made of a single metal or an alloy, and
    roll joining said first material to be joined and said second material to be joined under vacuum conditions wherein the joining temperature is in a range from 260 to 600° C. until the draft of said first material to be joined becomes 14% or greater.

14. A manufacturing method according to claim 13, wherein an intermediate layer is provided between said first material to be joined and said second material to be joined.

15. A manufacturing method according to claim 14, wherein a heat treatment is carried out after said roll joining under conditions wherein the treatment temperature is in a range from 300 to 500° C. and the heat treatment time is in a range from 10 to 60 minutes.

* * * * *